(12) United States Patent
Kuroishi et al.

(10) Patent No.: US 8,461,705 B2
(45) Date of Patent: Jun. 11, 2013

(54) FAUCET HYDROELECTRIC GENERATOR

(75) Inventors: Masahiro Kuroishi, Fukuoka-ken (JP); Naoyuki Onodera, Fukuoka-ken (JP); Tomoko Sato, Fukuoka-ken (JP)

(73) Assignee: Toto Ltd, Fukuoka (JP)

( * ) Notice: Subject to any disclaimer, the term of this patent is extended or adjusted under 35 U.S.C. 154(b) by 360 days.

(21) Appl. No.: 12/893,117

(22) Filed: Sep. 29, 2010

(65) Prior Publication Data
US 2011/0074157 A1   Mar. 31, 2011

(30) Foreign Application Priority Data
Sep. 29, 2009 (JP) ................... 2009-225578

(51) Int. Cl.
*F03B 13/00* (2006.01)

(52) U.S. Cl.
USPC .......................................................... 290/43

(58) Field of Classification Search
USPC .... 290/54, 43; 310/261.1; 60/325; 415/208.2
See application file for complete search history.

(56) References Cited

U.S. PATENT DOCUMENTS

| | | | | |
|---|---|---|---|---|
| 4,555,637 A | * | 11/1985 | Irvine | 290/52 |
| 4,740,711 A | * | 4/1988 | Sato et al. | 290/52 |
| 6,518,680 B2 | * | 2/2003 | McDavid, Jr. | 290/54 |
| 2006/0186671 A1 | * | 8/2006 | Honda et al. | 290/54 |
| 2008/0284174 A1 | * | 11/2008 | Nagler | 290/54 |
| 2008/0284175 A1 | * | 11/2008 | Nagler | 290/54 |
| 2010/0103646 A1 | * | 4/2010 | Coushaine et al. | 362/96 |

FOREIGN PATENT DOCUMENTS

| | | |
|---|---|---|
| JP | 10-009114 A | 1/1998 |
| JP | 2006-230145 A | 8/2006 |
| JP | 2009-047162 A | 3/2009 |

OTHER PUBLICATIONS

Japanese Office action for 2009-225578 dated Sep. 15, 2010.

* cited by examiner

*Primary Examiner* — Vanessa Girardi
(74) *Attorney, Agent, or Firm* — Pearne & Gordon LLP

(57) ABSTRACT

According to one embodiment, a faucet hydroelectric generator includes: a cylinder portion including a supply water inflow port and a supply water outflow port and having a supply water flow channel formed therein; a bucket having a rotation center axis generally parallel to the supply water flow channel, and including a bucket blade provided in the supply water flow channel so as to be rotatable about the rotation center axis; a magnet rotatable integrally with the bucket; a coil configured to generate electromotive force by rotation of the magnet; a nozzle portion including a plurality of injection ports configured to cause incoming water flowing parallel to the rotation center axis to be squirted in a plane generally perpendicular to the rotation center axis from radially outside the bucket blade toward the bucket blade; and a lid provided at an upstream end of the bucket blade and configured to rotate integrally with the bucket blade. The lid includes a thrust reducer configured to reduce a thrust force applied to the bucket.

14 Claims, 25 Drawing Sheets

FAUCET HYDROELECTRIC GENERATOR

CROSS-REFERENCE TO RELATED APPLICATIONS

This application is based upon and claims the benefit of priority from the prior Japanese Patent Application No. 2009-225578, filed on Sep. 29, 2009; the entire contents of which are incorporated herein by reference.

BACKGROUND OF THE INVENTION

1. Field of the Invention

This invention generally relates to a faucet hydroelectric generator, and more particularly a faucet hydroelectric generator generating electric power using a flow of water supply.

2. Description of the Related Art

Recently, faucet devices have often been equipped with electrical systems. For instance, there is known a faucet device equipped with a sensor for sensing a hand stretched out below the tap, and a solenoid valve for opening/closing the water supply channel based on the signal from the sensor. As another example, an LED (light emitting diode) lamp is incorporated near the water discharge port to change the color of light shed on the discharged water in accordance with the temperature of the discharged water.

If such an electrical system is incorporated in a faucet device, a power supply for operating the electrical system is required. This requirement can be met by using utility power. However, electrical wiring work is separately needed when the faucet device is installed. Furthermore, because the wiring is installed outside the faucet device, the wiring may degrade the appearance and cause a nuisance. On the other hand, if a battery is used as a power supply, there is no need to conduct electrical wiring work when the faucet device is installed. Furthermore, there is no need to install the wiring outside the faucet device. However, use of a battery as a power supply causes another problem of requiring battery replacement, which takes time and effort of maintenance. Furthermore, irrespective of whether utility power or a battery is used, a problem occurs from the viewpoint of resource saving and energy saving.

Thus, a small faucet hydroelectric generator is often disposed in the flow channel of the faucet device in order to obtain electrical power required for the operation of the electrical system incorporated in the faucet device.

In one of such faucet hydroelectric generators known in the art, water flows in from radially outside the bucket, and the inflow water flows out in the axial direction of the bucket (see, e.g., Patent Document 1).

The faucet hydroelectric generator disclosed in Patent Document 1 (JP-A-2009-047162) includes a nozzle for changing the direction of water flow generally parallel to the axial direction of the bucket to squirt water from radially outside the bucket blade toward the bucket blade. Furthermore, the configuration is such that the water squirted at the bucket blade flows out in the axial direction of the bucket near the center of the bucket. Furthermore, a ceiling 15d (corresponding to the lid in this invention) is provided on the upstream end surface of the bucket blade (see, e.g., paragraphs 0074 and 0080, FIGS. 14 to 20, etc. in Patent Document 1 (JP-A-2009-047162)).

In the faucet hydroelectric generator disclosed in Patent Document 1 (JP-A-2009-047162), the radial dimension can be decreased. Furthermore, the amount of outflow to the bypass flow channel can be suppressed. Hence, the variation of jet flow impinging on the respective bucket blades can be suppressed.

Here, the faucet hydroelectric generator disposed in the flow channel of the faucet device is generally intended for use at low flow rate. Thus, the faucet hydroelectric generator disclosed in Patent Document 1 (JP-A-2009-047162) can also achieve very high performance without any problem at low flow rate. However, it turns out that wear of the bearing portion may increase at high flow rate.

As the result of close study, the inventors have ascertained that the wear increase of the bearing portion is caused by the increase of thrust force acting on the bucket.

FIG. 30 is a schematic view for describing the thrust force acting on the bucket. The arrows depicted in the figure indicate the direction of flowing water.

As shown in FIG. 30, the faucet hydroelectric generator 60 includes a cylinder portion 67, a nozzle portion 63, a rotor 64, and a magnet 65. Furthermore, although not shown, a stator is provided outside the cylinder portion 67 so as to be opposed to the outer peripheral surface of the magnet 65. The rotor 64 includes a lid 61 (corresponding to the ceiling 15d in Patent Document 1 (JP-A-2009-047162)), a bucket 62, and a shaft 63. The lid 61 is provided at the upstream end of the bucket blade 62a. The downstream end portion of the shaft 63 is supported by a bearing portion 66, and the upstream end portion thereof is supported by a bearing, not shown. Hence, the force in the thrust direction applied to the bucket 62 is sustained by the bearing portion 66.

The lid 61 thus provided at the upstream end of the bucket blade 62a can eliminate water flowing out from the bucket blade 62a to the upstream side. This can increase water flowing in the bucket flow channel, and hence increase the power generation efficiency.

Here, between the lid 61 and the ceiling 67a of the cylinder portion 67, the rotary motion of water flow occurs due to the rotation of the rotor 64. However, it is difficult for the water to flow out from between the lid 61 and the ceiling 67a. Hence, the pressure tends to build up therebetween. Thus, the pressure of water between the lid 61 and the ceiling 67a increases and generates a force pushing the lid 61 to the downstream side, i.e., a thrust force 110 acting on the bucket 62. The generation of the thrust force 110 may increase wear of the bearing portion 66 supporting the thrust force 110 and of the end portion of the shaft 63.

According to the findings obtained by the inventors, the generated thrust force 110 is small at flow rates suitable for use of the faucet hydroelectric generator disclosed in Patent Document 1 (JP-A-2009-047162), such as approximately 1.8 liters/min (see, e.g., paragraphs 0061, 0063, 0065, etc. in Patent Document 1 (JP-A-2009-047162)). Hence, it can be said that there is no danger of abnormal wear of the bearing portion 66.

However, with the increase of flow rate, the generated thrust force 110 increases. Hence, there is demand for improvement of the faucet hydroelectric generator also used at relatively high flow rate (such as approximately 8 liters/min or more). That is, it is desired that the power generation efficiency is high even for power generation at relatively high flow rate, while wear of the bearing portion can also be suppressed.

SUMMARY OF THE INVENTION

The first invention relates to a faucet hydroelectric generator including: a cylinder portion including a supply water inflow port and a supply water outflow port and having a supply water flow channel formed in the cylinder; a bucket having a rotation center axis generally parallel to the supply water flow channel, and including a bucket blade provided in the supply water flow channel so as to be rotatable about the rotation center axis; a magnet rotatable integrally with the bucket; a coil configured to generate electromotive force by rotation of the magnet; a nozzle portion including a plurality of injection ports configured to cause incoming water flowing parallel to the rotation center axis to be squirted in a plane generally perpendicular to the rotation center axis from radially outside the bucket blade toward the bucket blade; and a lid provided at an upstream end of the bucket blade and configured to rotate integrally with the bucket blade, the lid including a thrust reducer configured to reduce a thrust force applied to the bucket.

As described above, if the lid is provided at the upstream end of the bucket blade, the lid can eliminate water flowing out to the upstream side from the bucket blade. This can increase water flowing in the bucket flow channel. Hence, the power generation efficiency can be increased.

However, the water flowing between the lid and the opposed wall surface (e.g., the second nozzle casing 9 described later) has a slow flow velocity, and hence has a small pressure gradient. Thus, the pressure of water flowing between the lid and the opposed wall surface increases and generates a force pushing the lid to the downstream side, i.e., a thrust force acting on the bucket. The generation of the thrust force may increase wear of the bearing portion (e.g., the upstream end portion of the receptacle 2e described later) supporting the thrust force.

Here, the generated thrust force is small at low flow rate (e.g., approximately 1.8 liters/min), and hence the wear is also small. However, with the increase of flow rate, the generated thrust force increases, and hence the wear may increase. In particular, in the faucet hydroelectric generator provided in a faucet device with a water discharge flow rate of approximately 8 liters/min or more, the wear may be severe.

In this invention, the lid includes a thrust reducer for reducing the thrust force applied to the bucket. Thus, the thrust force applied to the bucket can be reduced. Hence, while maintaining the high power generation efficiency achieved by providing the lid, the wear of the bearing portion (e.g., the upstream end portion of the receptacle 2e described later) supporting the bucket can also be reduced.

The second invention relates to the generator of the first invention, wherein the thrust reducer provided in the lid is a hole penetrating through the lid in an axial direction of the bucket blade, and is disposed with rotational symmetry about a point where the rotation center axis intersects with plane of the lid.

In this invention, the thrust reducer is a hole penetrating through the lid in the axial direction (thickness direction) of the bucket blade. By providing such a hole, the water between the lid and the opposed wall surface (e.g., the second nozzle casing 9 described later) can be caused to flow out through this hole. This suppresses the pressure build-up between the lid and the opposed wall surface. Thus, the increase of the pressure of water in this section is suppressed, and the generated thrust force can be reduced. Furthermore, by providing such a hole in the lid, the pressure receiving area can be decreased. This can also reduce the thrust force.

Furthermore, the hole is disposed with rotational symmetry about the rotation center axis. This is effective for load balancing. Thus, the influence of the hole on the rotation can be suppressed, and hence the rotation of the bucket can be made smooth. Consequently, the thrust force can be reduced while maintaining the high power generation efficiency.

Third invention relates to the generator of the second invention, wherein the lid covers a region formed by extending the water just squirted from the injection port to a traveling direction of the water, and the hole is disposed on a side of the rotation center axis of the region.

The water injected from the injection port does the maximum work immediately after inflow to the bucket blade. That is, it is the neighborhood of the outer periphery of the bucket blade that contributes most to the conversion from hydraulic energy to rotational energy. Thus, the power generation efficiency can be increased by providing the lid so as to cover at least the neighborhood of the outer periphery of the bucket blade subjected to the inflow of water (the region formed by extending the water just squirted from the injection port to its traveling direction). Furthermore, a large hole can be provided in a relatively large region radially inside the neighborhood of the outer periphery of the bucket blade. Thus, the effect of reducing the thrust force can also be increased. That is, the effect of reducing the thrust force can be maximized while maintaining the high power generation efficiency.

The fourth invention relates to the generator of the second invention, wherein the injection port is formed to be able to perform injection so that the lid covers a region formed by extending the water just squirted from the injection port to a traveling direction of the water.

The region formed by extending the water just squirted from the injection port to its traveling direction can be changed by the geometrical dimension of the injection port.

Thus, in this invention, the injection port is formed to enable injection so that the region formed by extending the water just squirted from the injection port to its traveling direction is covered with the lid.

According to this invention, the inflow water can be effectively prevented from flowing out from the bucket blade to the upstream side. Consequently, high power generation efficiency can be achieved while maintaining the effect of reducing the thrust force.

The fifth invention relates to the generator of the fourth invention, wherein line obtained by extending the rotation center axis side of outlet section of the injection port is located outside a region centered at the rotation center axis and having a radius given by a line segment connecting the rotation center axis to a position farthest from the rotation center axis on an periphery of the hole provided in the lid.

The line obtained by extending the radial inside of the outlet section of the injection port is located outside (radially outside) the position farthest from the rotation center axis on the periphery of the hole provided in the lid. This can effectively prevent the inflow water from flowing out from the bucket blade to the upstream side. Consequently, high power generation efficiency can be achieved while maintaining the effect of reducing the thrust force.

The sixth invention relates to the generator of the fourth invention, wherein the lid is provided so as to cover a radial outside of a curvature changing point of the bucket blade.

The bucket blade may have a curvature changing point depending on its shape. The term "curvature changing point" used herein refers to a point where the curvature of the bucket blade changes. The inflow water impinges on the bucket blade most strongly at the curvature changing point. Hence, the water may stagnate and generate a vortex at the curvature changing point. That is, near the curvature changing point, the water flow may be disturbed and generate a vortex. If the lid is located in the section where the vortex is generated, the thrust force may increase.

Thus, in this invention, the lid is configured so as not to cover the section including the curvature changing point, but to cover the radial outside of the curvature changing point, i.e., the outer periphery side of the bucket blade as much as possible. Consequently, this can suppress the increase of thrust force due to stagnation and vortices. Furthermore, by covering the outer periphery side of the bucket blade, high power generation efficiency can be achieved.

The seventh invention relates to the generator of the fourth invention, further including: a holding plate provided at a downstream end of the bucket blade and rotated integrally with the bucket blade, the holding plate being provided at least in a section opposed to the lid.

By providing the lid, the water collided with the major surface of the bucket blade can be prevented from escaping to the upstream side. However, another problem is that the water escapes to the downstream side in the section where the bucket flow channel has no bottom surface in relation to the lid.

Thus, in this invention, a holding plate serving as the bottom surface of the bucket flow channel is provided at least in the section opposed to the lid. This can suppress the escape of water to the downstream side. In particular, the escape of water to the upstream and downstream side can be blocked in the neighborhood of the periphery of the bucket blade, which contributes most to the conversion to rotational energy. Thus, high power generation efficiency can be achieved while maintaining the effect of reducing the thrust force.

The eighth invention relates to the generator of the seventh invention, wherein the holding plate includes a hole, and a dimension from a center of the bucket blade to a peripheral position farthest from the center of the bucket blade on a periphery of the hole provided in the lid is longer than a dimension from the center of the bucket blade to a periphery of the hole provided in the holding plate.

If the range covered with the lid is enlarged, the thrust force may increase. On the other hand, if the range covered with the lid and the holding plate is made too small, the water escapes to the upstream and downstream side.

In this invention, the dimensional relationship of the respective holes is defined so that the range covered with the lid is made smaller than the range covered with the holding plate. Thus, the thrust force is reduced by decreasing the range covered with the lid, whereas the power generation efficiency is increased by relatively enlarging the range covered with the holding plate.

The ninth invention relates to the generator of the seventh invention, further including: a pressure chamber on a downstream side of the holding plate, a dimension of the pressure chamber in the axial direction of the bucket blade being shorter than a dimension of space between the bucket blades in the axial direction of the bucket blade.

In this invention, a pressure chamber is provided on the downstream side of the holding plate. The dimension of the pressure chamber in the axial direction of the bucket blade is made shorter than the dimension of the space between the bucket blades in the axial direction of the bucket blade. That is, the height dimension of the pressure chamber is made shorter than the height dimension of the main flow channel (bucket flow channel). Thus, the water flowing in the pressure chamber has a slower flow velocity than the water flowing in the main flow channel (bucket flow channel). Consequently, the pressure gradient decreases, and the pressure increases. This generates a force pushing the holding plate to the upstream side. The force pushing the holding plate to the upstream side has an opposite direction to the aforementioned thrust force. Hence, the thrust force is canceled.

Thus, the effect of reducing the thrust force can be further increased.

The tenth invention relates to the generator the ninth invention, wherein the hole of the holding plate is provided near a center of the holding plate and communicates with a flow channel configured to allow the water squirted toward a major surface of the bucket blade to flow to the downstream side.

In order to allow the water squirted toward the major surface of the bucket blade to flow to the downstream side, the holding plate needs to include a hole communicating with the flow channel for passing the water to the downstream side.

In this invention, a hole is provided near the center of the holding plate. This can lengthen the dimension from inflow to outflow of the water injected at the bucket blade. Thus, the power generation efficiency can be increased.

Furthermore, this also enlarges the aforementioned pressure chamber. Hence, the force canceling the thrust force can be increased.

Consequently, this can further reduce the thrust force in conjunction with increasing the power generation efficiency.

The eleventh invention relates to the generator of the invention 2, wherein the lid is provided so as to cover at least neighborhood of an outer periphery of the bucket blade.

The lid is provided in order to suppress the water escaping from the bucket blade to the upstream side. Here, when a hole is provided to reduce the thrust force, if the hole is provided at a position near the outer periphery of the bucket blade where the water injected from the injection port does the maximum work, the power generation efficiency may significantly decrease. Thus, in this invention, the lid is configured to cover the neighborhood of the outer periphery of the bucket blade where the water injected from the injection port does the maximum work.

Accordingly, high power generation efficiency can be achieved while maintaining the effect of reducing the thrust force.

The twelfth invention relates to the generator of the second invention, wherein the lid includes an annular peripheral portion provided near a periphery of the bucket blade, a shaft holder provided at the rotation center axis of the bucket blade, and a rib connecting the peripheral portion to the shaft holder, and the rib is formed so that at least a part of the rib overlaps a part of the bucket blade as viewed in the axial direction of the bucket blade.

If the lid consists only of an annular peripheral portion provided near the periphery of the bucket blade, attachment of the lid requires center alignment with the bucket blade. This may impair the attachment workability.

In this invention, a rib is provided to connect the peripheral portion to the shaft holder provided at the rotation center axis of the bucket blade. Thus, insertion of a shaft into the shaft holder can facilitate the center alignment of the annular peripheral portion with the bucket blade.

The rib thus provided increases the pressure receiving area. Thus, the rib is formed so that at least part of the rib overlaps part of the bucket blade as viewed in the axial direction of the bucket blade. The pressure receiving area does not increase in the section where part of the rib overlaps part of the bucket blade. Hence, impairment of the effect of reducing the thrust force can be suppressed.

Consequently, the attachment workability of the lid can be improved while maintaining the effect of reducing the thrust force.

Thirteenth invention relates to the generator of the twelfth, wherein as viewed in the axial direction of the bucket blade, the rib is configured so that the rib and the bucket blade are identical in shape, or that the rib is smaller than the bucket blade.

In this invention, as viewed in the axial direction of the bucket blade, the rib does not extend out of the bucket blade. Hence, the pressure receiving area is not increased by providing the rib. Thus, the effect of reducing the thrust force can be further improved, and the attachment workability of the lid can be improved.

The fourteenth invention relates to the generator of the twelfth invention, wherein the rib is provided in a plurality, and the ribs are disposed in a number of three with rotational symmetry about the rotation center axis.

To reduce the thrust force, it is preferable to downsize the lid. However, the lid receives not only the thrust force, but also a force from directions crossing the direction of the thrust force due to water pressure and rotation. Thus, depending on the size of the lid, the lid may be deformed in the radial or other direction by the force from directions crossing the direction of the thrust force.

In this case, the deformation of the lid can be reduced by providing the rib. However, a single rib cannot counteract a force acting from various directions. Furthermore, even two ribs cannot counteract a force from directions crossing the direction of the ribs. On the other hand, with the increase in the number of ribs, the pressure receiving area increases, and may increase the thrust force.

According to the findings obtained by the inventors, three ribs disposed with rotational symmetry about the rotation center axis can facilitate center alignment and counteract forces from various directions. Furthermore, while meeting these requirements, the increase of the pressure receiving area can be minimized. Furthermore, the ribs disposed with rotational symmetry about the rotation center axis are effective for load balancing. Thus, the influence of the ribs on the rotation can be suppressed, and hence the rotation of the bucket can be made smooth.

Consequently, this can lead to improvement in attachment workability, improvement in bearing strength against forces from various directions, high power generation efficiency, and reduction of the thrust force.

BRIEF DESCRIPTION OF THE DRAWINGS

FIG. 9A shows the case where the hole is coaxially provided in the lid, and FIG. 9B shows the case where the holes are disposed with rotational symmetry about the rotation center axis of the bucket;

FIGS. 14A to 15B are schematic views for illustrating the relationship between the lid and the bottom surface of the bucket flow channel, FIGS. 14A and 15A are schematic sectional views, and FIGS. 14B and 15B are schematic plan views of the lids;

DETAILED DESCRIPTION OF THE INVENTION

Figure 1:
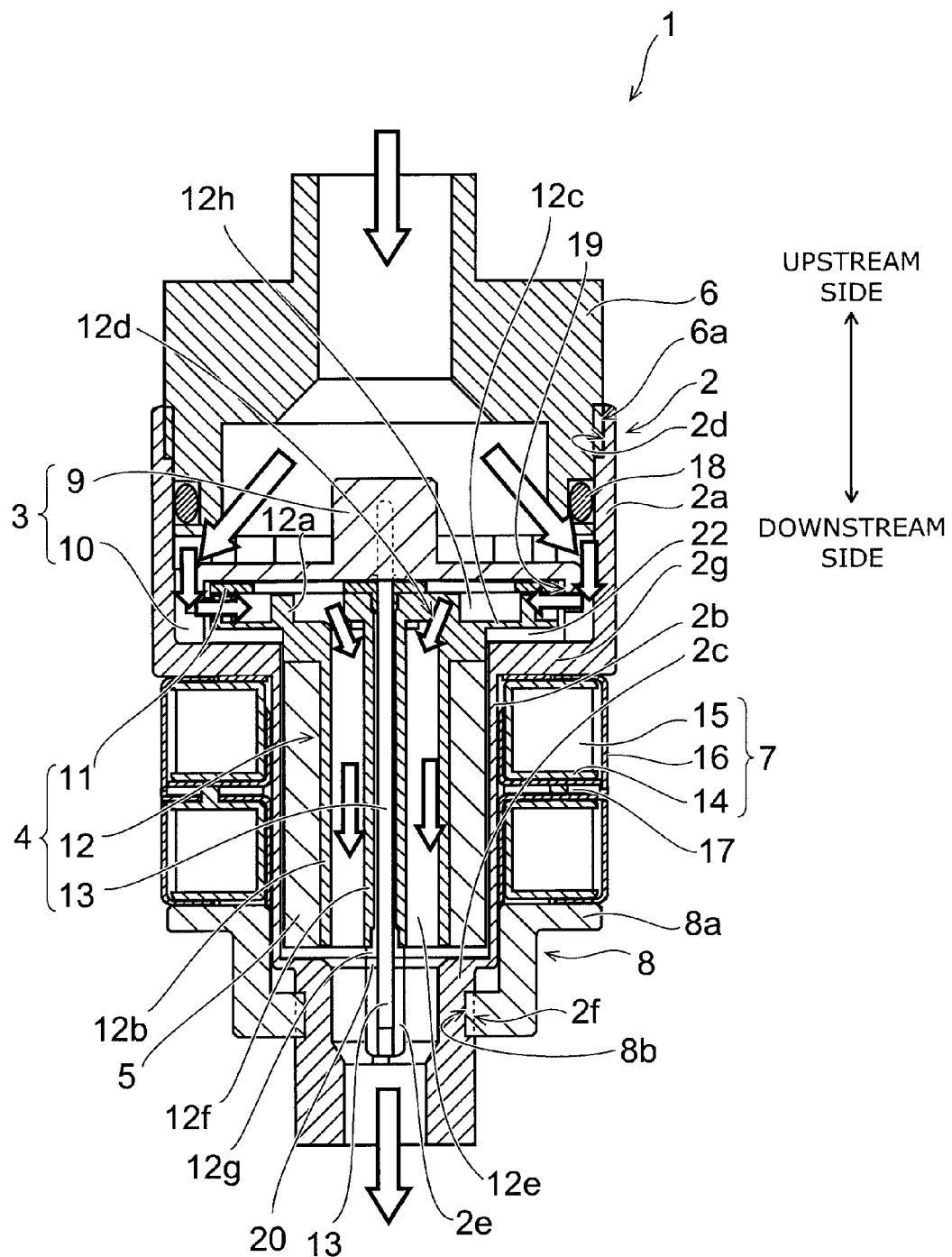
FIG. 1 is a schematic sectional view for illustrating a faucet hydroelectric generator according to an embodiment of the invention.

Embodiments of the invention will now be illustrated with reference to the drawings. In the drawings, similar components are labeled with like reference numerals, and the detailed description thereof is omitted as appropriate.

FIG. 1 is a schematic sectional view for illustrating a faucet hydroelectric generator according to an embodiment of the invention.

Figure 2:
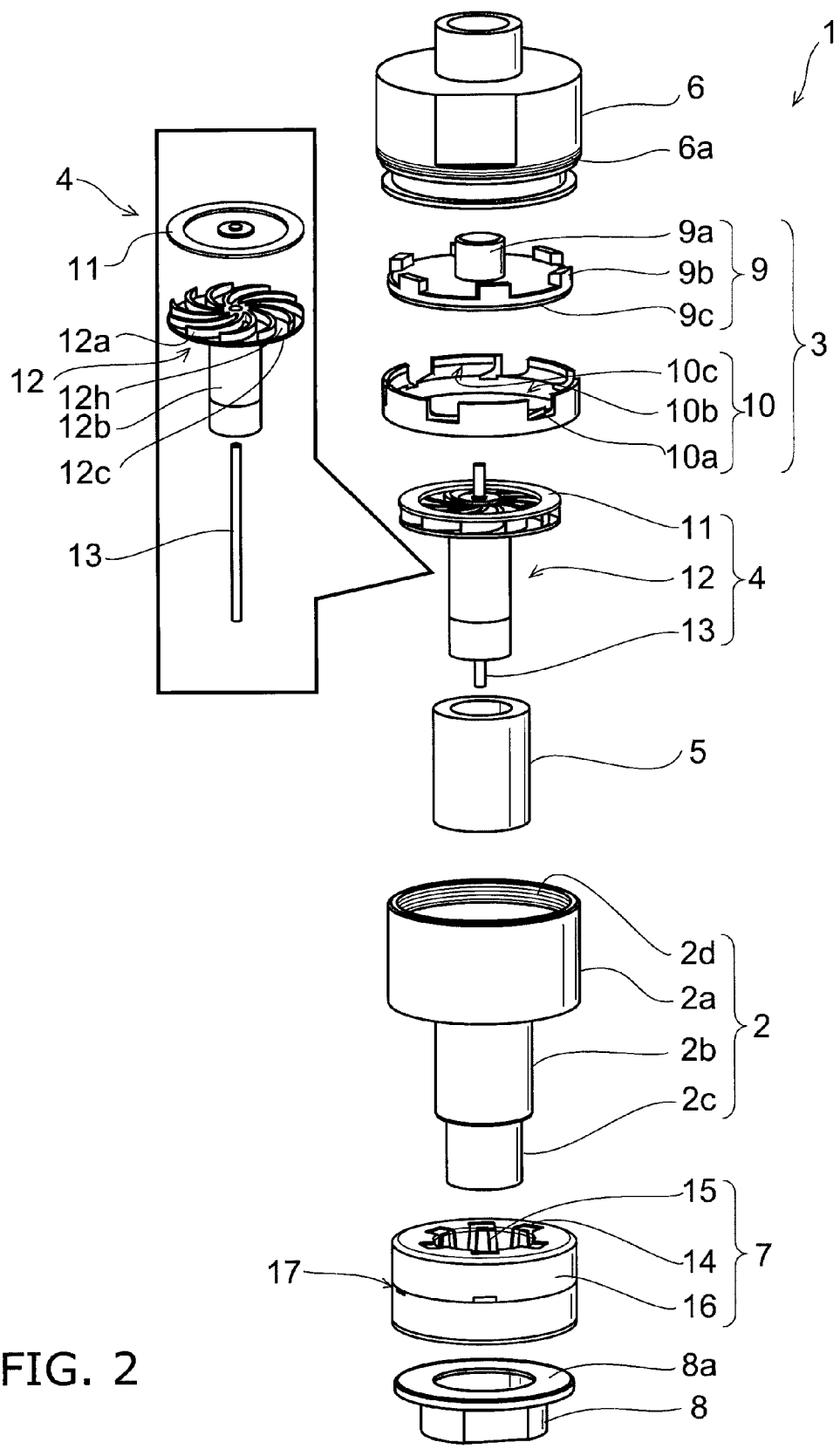
FIG. 2 is a schematic exploded view of the faucet hydroelectric generator according to the embodiment of the invention.

FIG. 2 is a schematic exploded view of the faucet hydroelectric generator according to the embodiment of the invention.

Figure 3A:
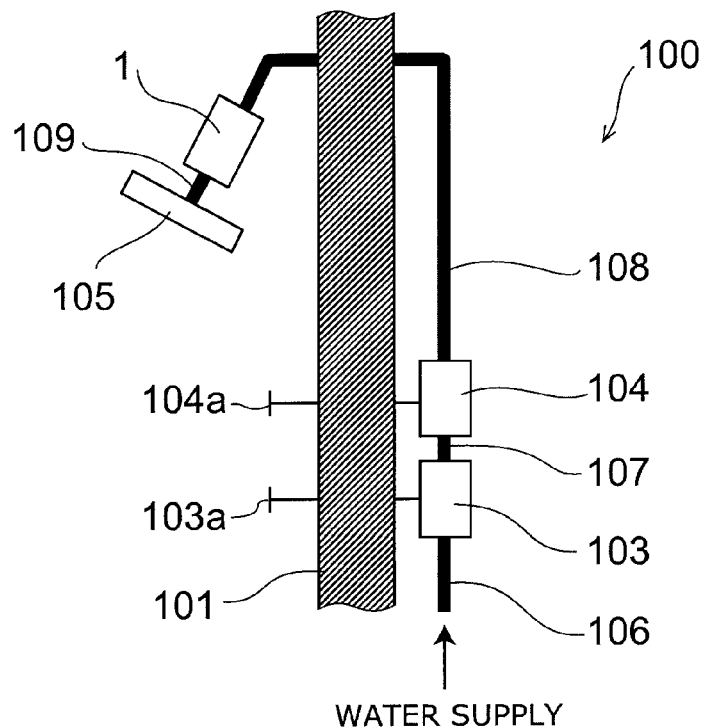
FIGS. 3A and 3B are schematic views for describing installation examples of the faucet hydroelectric generator according to the embodiment of the invention.
Figure 3B:
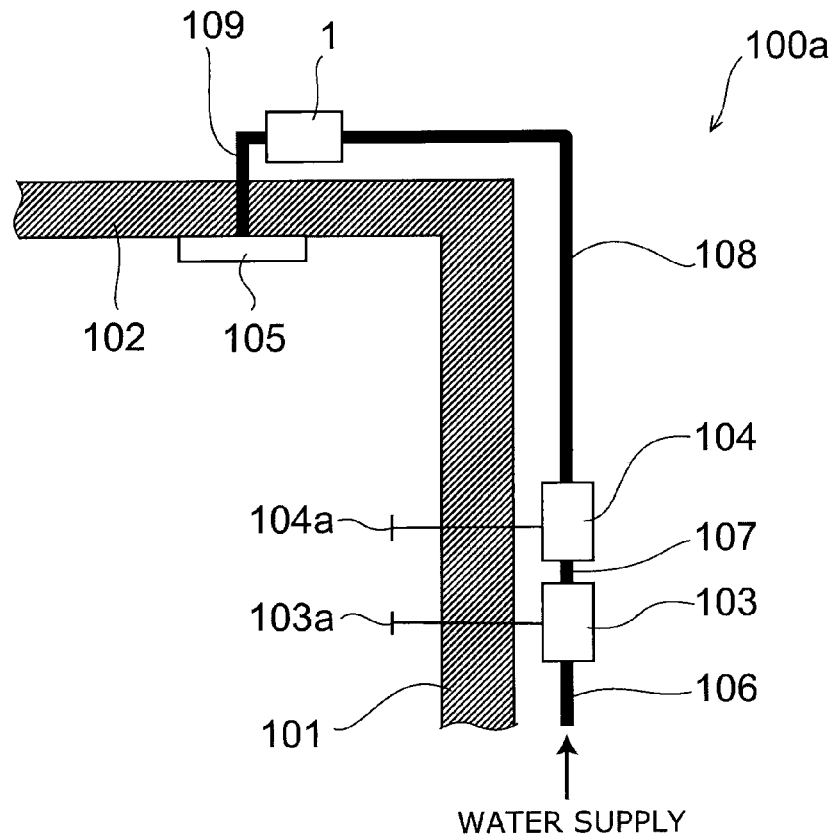

FIGS. 3A and 3B are schematic views for describing installation examples of the faucet hydroelectric generator according to the embodiment of the invention.

First, the installation examples of the faucet hydroelectric generator 1 shown in FIGS. 3A and 3B are described.

FIGS. 3A and 3B illustrate so-called shower faucet devices 100, 100a provided with the faucet hydroelectric generator 1.

Such shower faucet devices 100, 100a are provided in a bathroom, for instance. Here, FIG. 3A shows the case where a shower head 105 is provided so as to be spaced from a wall surface 101. FIG. 3B shows the case where a shower head 105 is provided in abutment with a ceiling surface 102.

As shown in FIGS. 3A and 3B, the shower faucet device 100, 100a includes a flow rate adjustment valve 103, a temperature adjustment valve 104, a shower head 105, and a faucet hydroelectric generator 1. The flow rate adjustment valve 103 is connected through a piping 106 to a water supply source, not shown, for supplying e.g. tap water. A manipulation handle 103a is provided on the flow rate adjustment valve 103. By manipulating the manipulation handle 103a, the amount of water discharged from the shower head 105 can be adjusted.

The temperature adjustment valve 104 is connected through a piping 107 to the flow rate adjustment valve 103. Furthermore, the temperature adjustment valve 104 is connected through a piping to a hot water unit, not shown, for supplying hot water. A manipulation handle 104a is provided on the temperature adjustment valve 104. By manipulating the manipulation handle 104a, the mixing ratio of the supplied water and hot water can be varied to adjust the temperature of water discharged from the shower head 105.

The faucet hydroelectric generator 1 is connected through a piping 108 to the temperature adjustment valve 104. Furthermore, the faucet hydroelectric generator 1 is connected through a piping 109 to the shower head 105. Here, as shown in FIG. 3A, the faucet hydroelectric generator 1 can be provided inside the space defined by the wall surface 101, such as in a bathroom. Alternatively, as shown in FIG. 3B, the faucet hydroelectric generator 1 can be provided outside the space defined by the wall surface 101 and the ceiling surface 102, such as outside a bathroom.

The shower head 105 includes shower holes, not shown, so that the supplied water can be discharged like a shower.

In such shower faucet devices 100, 100a, the water supplied through the piping 106 is adjusted in flow rate by the flow rate adjustment valve 103, and adjusted in temperature by the temperature adjustment valve 104. Then, the water ejected from the temperature adjustment valve 104 passes through the faucet hydroelectric generator 1 and is discharged from the shower head 105 like a shower. Here, the hydraulic power of the water flowing in the faucet hydroelectric generator 1 is used for power generation. The generated electrical power is used for, e.g., illumination, generation of electrolyzed functional water such as alkaline ion water and silver ion-containing water, flow rate indication (measurement), temperature indication, and audio guidance.

As described later, the faucet hydroelectric generator 1 according to this embodiment can increase the power generation efficiency even in the case where the water discharge flow rate is relatively high. Furthermore, in the faucet hydroelectric generator 1, the wear of the receptacle 2e described later can be reduced. Hence, the faucet hydroelectric generator 1 is suitable for installation in the shower faucet device 100, 100a, but is not limited thereto. For instance, the faucet hydroelectric generator 1 can be provided in a faucet device with relatively high water discharge flow rate, such as a toilet faucet device installed on the toilet bowl and urinal. Furthermore, the faucet hydroelectric generator 1 can be provided in a kitchen faucet device, a faucet device for a living/dining room, and a lavatory faucet device. In this case, for instance, the faucet hydroelectric generator 1 can be provided in a faucet device with a water discharge flow rate of approximately 8 liters/min or more.

Thus, the term "faucet" used herein includes not only commonly-used faucets, but also "shower" and "urinal flushing device", for instance.

Next, returning to FIGS. 1 and 2, the faucet hydroelectric generator 1 is illustrated.

The faucet hydroelectric generator 1 primarily includes a cylinder portion 2, a nozzle portion 3, a rotor 4, a magnet 5, a sealing portion 6, a stator 7, and a stator holder 8. The arrows depicted in the figure indicate the direction of flowing water.

The cylinder portion 2 has a stepped shape including a large diameter portion 2a, a medium diameter portion 2b, and a small diameter portion 2c. The cylinder portion 2 includes a supply water inflow port and a supply water outflow port, and has a supply water flow channel formed therein. Sequentially from the upstream side, the cylinder portion 2 includes therein the sealing portion 6, the nozzle portion 3, the rotor 4, and the magnet 5. The sealing portion 6, the nozzle portion 3, and the bucket blade 12a of a bucket 12 provided in the rotor 4 are provided inside the large diameter portion 2a. The bucket boss 12b of the bucket 12 provided in the rotor 4, and the magnet 5 are provided inside the medium diameter portion 2b.

Inside the small diameter portion 2c, a receptacle 2e for holding one end of the shaft 13 is provided. The receptacle 2e is coupled to the inner wall surface of the small diameter portion 2c by radial connecting members, not shown. The space between the connecting members is not occluded but opened. Hence, the flow of water flowing out of the hole 12e described later is not blocked. Furthermore, the upstream end of the receptacle 2e abuts the holder 12g described later via a spacer 20. Hence, the thrust force 110 pushing the rotor 4 to the downstream side can be supported by the receptacle 2e. That is, the receptacle 2e supports the thrust force 110 applied to the bucket 12 (rotor 4).

The small diameter portion 2c and the sealing portion 6 are connected to pipings, not shown, so that the inside of the cylinder portion 2 communicates with the water supply flow channel. Here, for instance, as illustrated in FIGS. 3A and 3B, the cylinder portion 2 is disposed so that the central axis direction of the cylinder portion 2 is generally parallel to the direction of flowing water. Furthermore, the cylinder portion 2 is disposed so that the small diameter portion 2c is directed to the downstream side and the large diameter portion 2a is directed to the upstream side.

The sealing portion 6 is provided at the supply water inflow port of the cylinder portion 2. A stepped hole is provided inside the sealing portion 6 so that the stepped hole communicates with the supply water flow channel. The opening at the upstream end of the large diameter portion 2a is liquid-tightly sealed by the sealing portion 6 via an O-ring 18. A female screw portion 2d is provided near the opening at the upstream end of the large diameter portion 2a. The female screw portion 2d is screwed with a male screw portion 6a provided on the side surface of the sealing portion 6 so that the sealing portion 6 can be fixed to the opening at the upstream end of the large diameter portion 2a. Here, when the sealing portion 6 is fixed to the opening at the upstream end of the large diameter portion 2a, the axial position of the second nozzle casing 9 described later is restricted. This will be described later in detail.

The nozzle portion 3 includes a plurality of injection ports 19 for causing incoming water flowing parallel to the rotation center axis to be squirted in the plane generally perpendicular to the rotation center axis from radially outside the bucket blade 12a toward the bucket blade 12a.

Furthermore, the nozzle portion 3 includes a second nozzle casing 9 and a first nozzle casing 10.

The second nozzle casing 9 is shaped like a disc. At the center of the second nozzle casing 9, a casing boss 9a protruding to the upstream side is provided. At the periphery of the second nozzle casing 9, a plurality of abutting portions 9b protruding to the upstream side are provided. The casing boss 9a includes therein a depression for rotatably holding one end of the shaft 13. The upstream end surface of the abutting portion 9b is configured so as to abut the sealing portion 6. A guiding portion 9c is provided at the end periphery of the second nozzle casing 9. Here, the abutting portions 9b do not necessarily need to be provided on the second nozzle casing 9, but can be provided on the sealing portion 6.

The first nozzle casing 10 has an annular shape, and includes therein a stepped hole 10b. The corner portion 10c of the stepped section of the stepped hole 10b is shaped so that the corner portion 10c can abut the guiding portion 9c provided at the end periphery of the second nozzle casing 9. Furthermore, a plurality of nozzle grooves 10a penetrating to the stepped hole 10b are provided in the peripheral surface of the first nozzle casing 10. The axial position of the abutting portions 9b is restricted by the sealing portion 6, and thereby the second nozzle casing 9 is fixed so as to seal the opening at the upstream end of the first nozzle casing 10. Furthermore, when the second nozzle casing 9 is fixed to the first nozzle casing 10, the second nozzle casing 9 and the nozzle groove 10a form an injection port 19. When the second nozzle casing 9 is fixed to the first nozzle casing 10, a space is formed inside the first nozzle casing 10. The bucket blade 12a of the bucket 12 is provided in this space. The injection port 19 is opened toward the bucket blade 12a housed in the space formed inside the first nozzle casing 10. The direction of the injection port 19 is directed to the inside of the tangential direction of the circumscribed circle of the bucket blades 12a. Such an injection port 19 can cause incoming water flowing parallel to the rotation center axis to be squirted in the plane generally perpendicular to the rotation center axis from radially outside the bucket blade 12a toward the bucket blade 12a. Furthermore, the direction of the water squirted from the injection port 19 is directed to the inside of the tangential direction of the circumscribed circle of the bucket blades 12a.

The rotor 4 includes a lid 11, a bucket 12, and a shaft 13.

The lid 11 is shaped like a plate and includes a hole penetrating through the lid 11 in the axial direction of the bucket blade 12a (hereinafter referred to as "hole penetrating in the thickness direction of the lid"). The lid 11 is provided at the upstream end of the bucket blade 12a and configured so as to rotate integrally with the bucket blade 12a.

The details of the lid 11 are described later.

The bucket 12 includes a bucket blade 12a, a bucket boss 12b, and a holding plate 12c, and is provided in the supply water flow channel. That is, the bucket 12 has a rotation center axis generally parallel to the supply water flow channel, and includes a bucket blade 12a provided in the supply water flow channel so as to be rotatable about the rotation center axis.

The bucket blade 12a is shaped in a curved fashion, and curved so that its tip is brought close to the center of the bucket 12. The number of bucket blades 12a is different from integer multiples of the number of injection ports 19. For instance, in the example illustrated in FIG. 2, the number of bucket blades 12a is eleven, and the number of injection ports 19 is six. If the number of bucket blades 12a is different from integer multiples of the number of injection ports 19, then the water squirted from the injection ports 19 can be caused to impinge on the neighborhood of the outer periphery of the respective bucket blades 12a at different times. Hence, the occurrence of vibration and noise in the bucket 12 can be suppressed.

At the downstream end of the bucket blade 12a, a holding plate 12c for holding the bucket blade 12a is provided. That is, the holding plate 12c is provided at the downstream end of the bucket blade 12a and rotates integrally with the bucket blade 12a. The space defined by the bucket blade 12a and the holding plate 12c constitutes a bucket flow channel 12h.

Near the center of the holding plate 12c, a hole 12d is provided. The hole 12d allows the water passed through the bucket flow channel 12h to flow to the downstream side. That is, the hole 12d of the holding plate 12c is provided near the center of the holding plate 12c and communicates with the flow channel (hole 12e) for allowing the water squirted toward the bucket blade 12a to flow to the downstream side.

Thus, in order to allow the water squirted toward the bucket blade 12a to flow to the downstream side, the holding plate needs to include a hole 12d communicating with the flow channel for passing the water to the downstream side.

In this embodiment, a hole is provided near the center of the holding plate 12c. This can lengthen the dimension from inflow to outflow of the water injected at the bucket blade 12a. Thus, the power generation efficiency can be increased.

Furthermore, this also enlarges the pressure chamber 22 described later. Hence, the force 111 canceling the thrust force 110 can be increased. The details of the pressure chamber 22 are described later.

Consequently, this can further reduce the thrust force 110 in conjunction with increasing the power generation efficiency.

The bucket boss 12b is provided on the downstream side of the bucket blade 12a. The bucket boss 12b includes therein a hole 12e penetrating in the axial direction. One end of the hole 12e communicates with the hole 12d. The hole 12e serves as a flow channel for allowing the water passed through the bucket flow channel 12h to flow to the downstream side. At the center of the bucket boss 12b, an insertion portion 12f for inserting the shaft 13 is provided. At the downstream end of the insertion portion 12f, a holder 12g for causing the insertion portion 12f to hold the shaft 13 is provided.

The shaft 13 is shaped like a cylindrical column. One end of the shaft 13 protrudes from the bucket blade 12a to the upstream direction, and the other end protrudes from the bucket boss 12b to the downstream direction. The upstream end of the shaft 13 is rotatably held by the casing boss 9a. The downstream end is rotatably held by the receptacle 2e. The lid 11, the bucket 12, and the shaft 13 are integrated into a rotor 4 so that the rotor 4 thus integrated rotates about the shaft 13.

On the outer peripheral surface (radially outside end surface) of the bucket boss 12b, a cylindrical magnet 5 is provided. The magnet 5 is rotatable integrally with the bucket 12. The outer peripheral surface (radially outside end surface) of the magnet 5 is alternately magnetized to N pole and S pole along the circumferential direction.

Outside the medium diameter portion 2b of the cylinder portion 2, a stator 7 is provided opposite to the outer peripheral surface of the magnet 5.

Figure 4A:
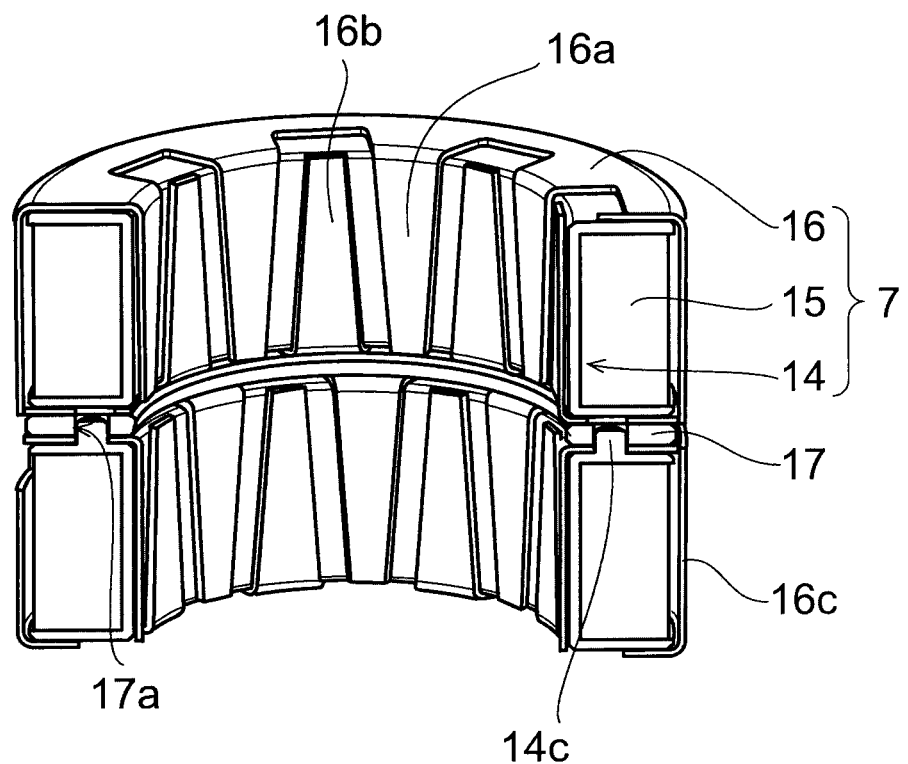
FIG. 4A is a schematic sectional view for illustrating the stator.
Figure 4B:
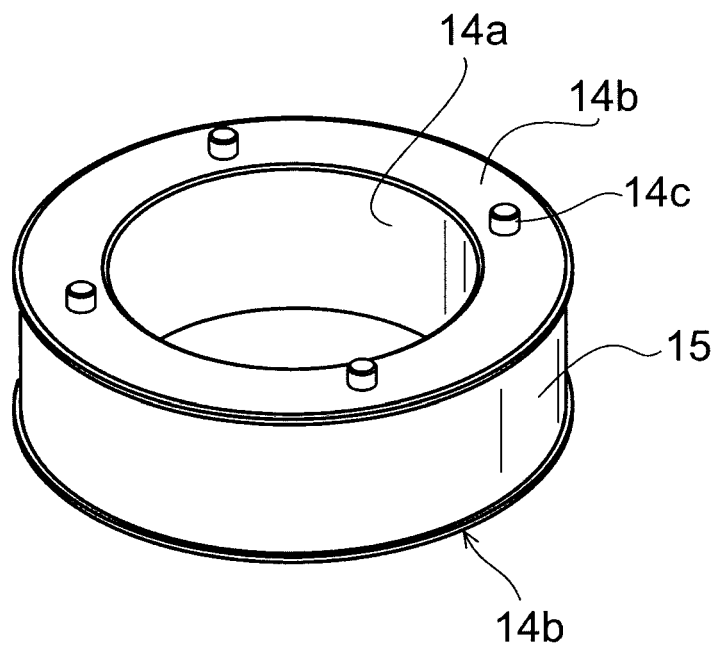
FIG. 4B is a schematic perspective view for illustrating a bobbin and a coil.

FIGS. 4A and 4B are schematic views for illustrating the stator. More specifically, FIG. 4A is a schematic sectional view for illustrating the stator. FIG. 4B is a schematic perspective view for illustrating a bobbin and a coil.

As shown in FIG. 4A, the stator 7 includes a bobbin 14, a coil 15, and a yoke 16. The stator 7 is disposed in the radial direction (radially outside direction in the example illustrated in FIGS. 4A and 4B) of the magnet 5. The stator 7 is provided in a plurality (two in the example illustrated in FIGS. 4A and 4B) so as to be stacked in the axial direction via a setting portion 17.

As shown in FIG. 4B, the bobbin 14 includes a bobbin boss 14a, a flange 14b, and a protrusion 14c.

The bobbin boss 14a is shaped like a cylinder. On both end surfaces of the bobbin boss 14a, annular flanges 14b are provided. The outer periphery of the flange 14b is configured so as to protrude in the radially outside direction of the bobbin boss 14a. In the space between the flanges 14b radially outside the bobbin boss 14a, an annularly wound coil 15 is provided. More specifically, the coil 15 is formed by winding a wire around the bobbin 14, and generates electromotive force by rotation of the magnet 5.

A protrusion 14c is provided on the flange 14b provided on the side where the stators 7 are opposed to each other. The protrusion 14c is shaped like a cylindrical column. The protrusion 14c is fitted into a depression 17a provided in a setting portion 17 so that the stators 7 can be positioned relative to each other in the circumferential direction.

The yoke 16 is formed form a magnetic material (e.g., rolled steel). The yoke 16 is provided so as to surround the outer peripheral surface of the coil 15, the end surface of the flange 14b, and the inner peripheral surface of the bobbin boss 14a. In the yoke 16, the section opposed to the inner peripheral surface of the bobbin boss 14a, i.e., the inner peripheral surface of the coil 15, constitutes so-called inductors 16a, 16b. The section provided around the coil 15 constitutes a base 16c.

The inductors 16a are equally spaced along the circumferential direction of the coil 15, and each inductor 16a is disposed between the inductors 16b. That is, the inductor 16a and the inductor 16b are alternately disposed along the circumferential direction of the coil 15 and spaced from each other. Thus, the inductors 16a, 16b are opposed to the outer peripheral surface (radially outside surface) of the magnet 5. That is, a plurality of inductors 16a, 16b are spaced from each other, and the inductor 16a, 16b has a section radially opposed to the magnet 5 and magnetically interacts therewith.

The details of the setting portion 17 and the positional relationship between the end surface of the magnet 5 and the end surface of the yoke 16 (stator 7) are described later.

Inside the stator holder 8, a stepped hole is provided so as to penetrate in the axial direction. Into the hole having a large radial dimension, the medium diameter portion 2b can be inserted. Into the hole having a small radial dimension, the small diameter portion 2c can be inserted. A flange 8a is provided at the end on the side where the hole having the large radial dimension is provided. A female screw portion 8b is provided on the hole having the small radial dimension so as to be screwed with a male screw portion 2f provided on the outer peripheral surface of the small diameter portion 2c. Thus, the male screw portion 2f is screwed with the female screw portion 8b, and thereby the stator 7 can be sandwiched and held between the downstream end portion 2g of the large diameter portion 2a and the flange 8a.

Next, the lid 11 is further illustrated.

Figure 5:
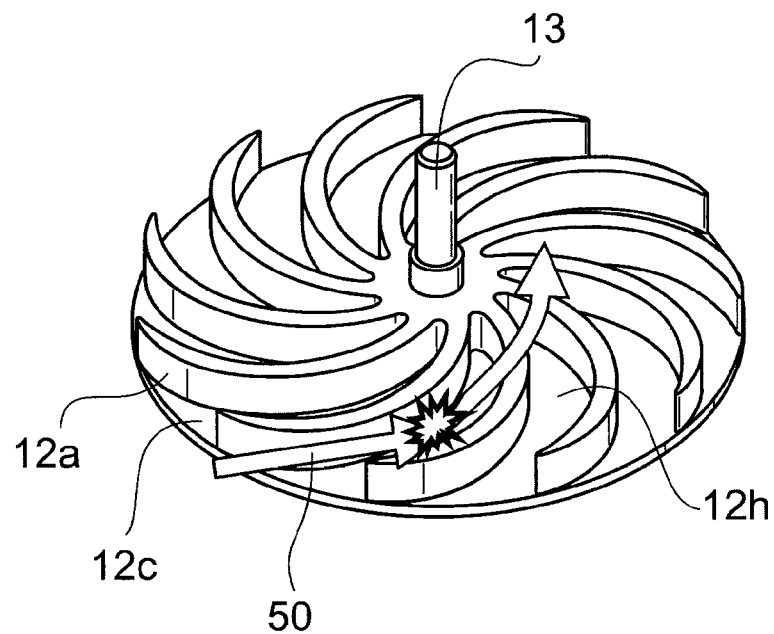
FIGS. 5 and 6 are schematic perspective views for illustrating comparative examples.
Figure 6:
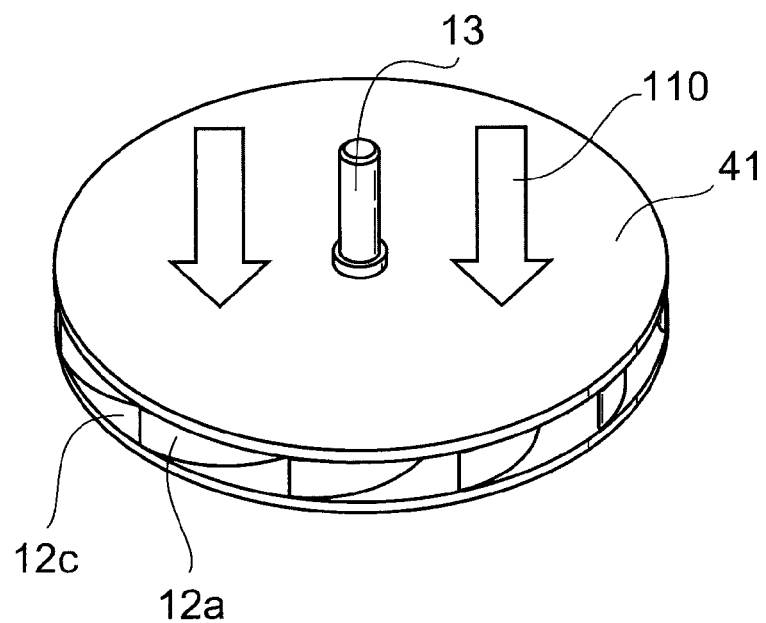

FIGS. 5 and 6 are schematic perspective views for illustrating comparative examples. The examples illustrated in FIGS. 5 and 6 are investigated by the inventors in the process of making this invention.

As shown in FIG. 5, in the case where the upstream end of the bucket blade 12a is opened, the water 50 squirted from the injection port 19 impinges on the bucket blade 12a, then changes its flow direction to the upstream side, and flows out of the bucket blade 12a. This decreases the water flowing in the bucket flow channel 12h, and hence decreases the power generation efficiency.

In this case, as shown in FIG. 6, a plate-like lid 41 can be provided at the upstream end of the bucket blade 12a. Then, the squirted water 50 can be prevented from flowing out of the bucket blade 12a. This can increase the water flowing in the bucket flow channel 12h, and hence can increase the power generation efficiency.

Here, between the lid 41 and the second nozzle casing 9, the rotary motion of water flow occurs due to the rotation of the rotor 4. However, it is difficult for the water to flow out from between the lid 41 and the second nozzle casing 9. Hence, the pressure tends to build up therebetween. Thus, the pressure of water between the lid 41 and the second nozzle casing 9 increases and generates a force pushing the lid 41 to the downstream side, i.e., a thrust force 110. The generation of the thrust force 110 increases the force acting between the upstream end portion of the receptacle 2e and the downstream end portion of the holder 12g. This may increase wear of the upstream end portion of the receptacle 2e, the downstream end portion of the holder 12g, and the spacer 20. That is, the wear of the bearing portion may increase.

Here, the generated thrust force 110 is small at low flow rate (e.g., approximately 1.8 liters/min), and hence the wear is also small. However, with the increase of flow rate, the generated thrust force 110 increases, and hence the wear may increase. In particular, in the case where the faucet hydroelectric generator 1 is provided in a faucet device with a water discharge flow rate of approximately 8 liters/min or more, the wear may be severe.

Thus, this embodiment includes a thrust reducer for reducing the thrust force applied to the bucket.

The thrust reducer can illustratively include the hole penetrating in the thickness direction of the lid, the pressure chamber 22 provided on the downstream side of the holding plate 12c, i.e., the pressure chamber 22 provided between the holding plate 12c and the inner wall surface of the downstream end portion 2g of the large diameter portion 2a, and the positional relationship between the end surface of the magnet 5 and the end surface of the yoke 16 (stator 7).

Next, the thrust reducer is illustrated.

First, as a thrust reducer, the hole penetrating in the thickness direction of the lid is illustrated.

Figure 7A:
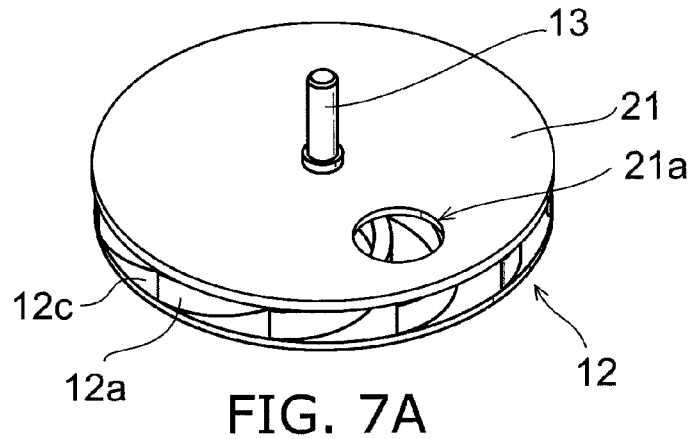
FIGS. 7A to 7C are schematic perspective views for illustrating the hole as a thrust reducer.
Figure 7B:
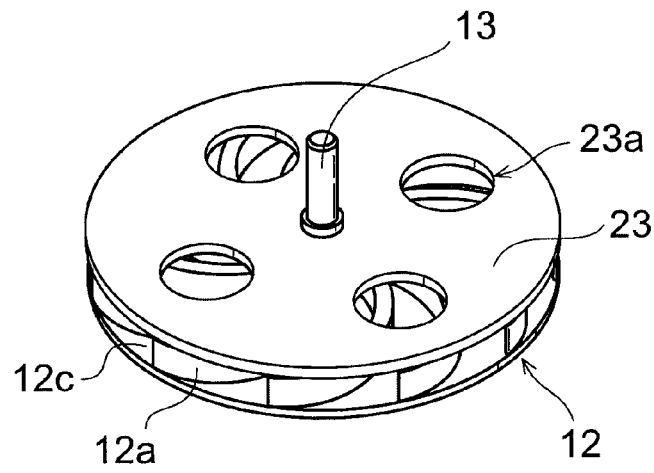
Figure 7C:
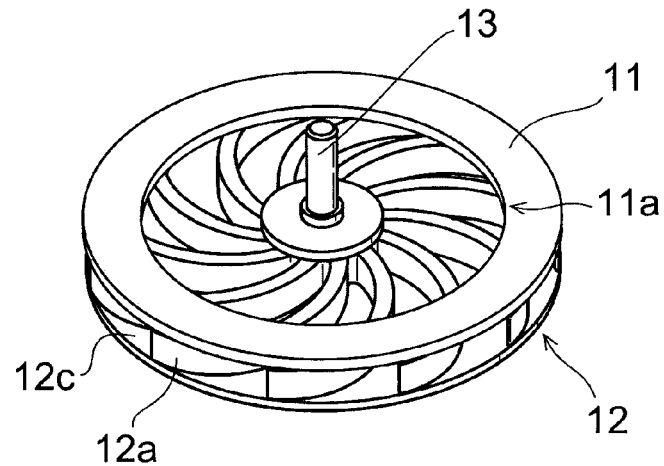

FIGS. 7A to 7C are schematic perspective views for illustrating the hole as a thrust reducer.

If a hole penetrating in the thickness direction of the lid is provided, the water between the lid and the second nozzle casing 9 can be allowed to flow out through the hole. This suppresses the pressure build-up between the lid and the second nozzle casing 9. Thus, the pressure build-up of water in this section is suppressed, and the generated thrust force 110 can be reduced. Furthermore, by providing the hole, the pressure receiving area can be decreased. This can also reduce the thrust force 110.

For instance, as shown in FIG. 7A, a hole 21a can be provided in the plate-like lid 21 provided at the upstream end of the bucket blade 12a.

Furthermore, as shown in FIG. 7B, a plurality of holes 23a can be provided in the plate-like lid 23 provided at the upstream end of the bucket blade 12a. By providing a plurality of holes 23a, the amount of water flowing out from between the lid 23 and the second nozzle casing 9 can be increased, and the pressure receiving area can be decreased.

Thus, the thrust force 110 can be further reduced. Here, the number of holes 23a is not limited to that shown, but can be varied as appropriate.

In this case, the holes 23a can be disposed with rotational symmetry about the rotation center axis of the bucket 12. This is effective for load balancing. Thus, the influence of the holes on the rotation can be suppressed, and hence the rotation of the bucket can be made smooth. Consequently, the thrust force can be reduced while maintaining the high power generation efficiency. Here, as shown in FIG. 7B, if the holes 23a are disposed with point symmetry about the rotation center axis of the bucket 12, the load balancing can be made more uniform.

Alternatively, as shown in FIG. 7C, a hole 11a can be coaxially provided in the plate-like lid 11 provided at the upstream end of the bucket blade 12a. This can further increase the amount of water flowing out from between the lid 11 and the second nozzle casing 9, and further decrease the pressure receiving area. Thus, the thrust force 110 can be significantly reduced. Furthermore, the load balancing can also be made even more uniform.

In this case, the lid is provided at only part of the upstream end of the bucket blade 12a. Hence, it may be contemplated that the power generation efficiency decreases. However, according to the findings obtained by the inventors, if the lid is provided in the neighborhood of the outer periphery of the bucket blade 12a, which contributes most to the conversion to rotational energy, then the power generation efficiency can be increased to the level comparable to that for the entirely covered case as shown in FIG. 6. That is, preferably, the lid is provided so as to cover at least the neighborhood of the outer periphery of the bucket blade 12a.

In FIG. 7B, the holes 23a are disposed with rotational symmetry about the point where the rotation center axis intersects with the plane of the lid 23.

The term "rotational symmetry" used herein includes not only the situation illustrated in FIG. 7B, but also the situation illustrated in FIG. 7C. That is, in this invention, the hole 11a disposed coaxially with the rotation center axis is also referred to as a hole disposed with "rotational symmetry".

The lid is provided in order to suppress the water escaping from the bucket blade 12a to the upstream side. Here, when a hole is provided to reduce the thrust force 110, if the hole is provided at a position near the outer periphery of the bucket blade 12a where the water injected from the injection port 19 does the maximum work, the power generation efficiency may significantly decrease. Thus, preferably, the lid is configured to cover the neighborhood of the outer periphery of the bucket blade 12a where the water injected from the injection port 19 does the maximum work.

Accordingly, high power generation efficiency can be achieved while maintaining the effect of reducing the thrust force 110.

Next, the positional relationship concerning the lid is illustrated.

Figure 8:
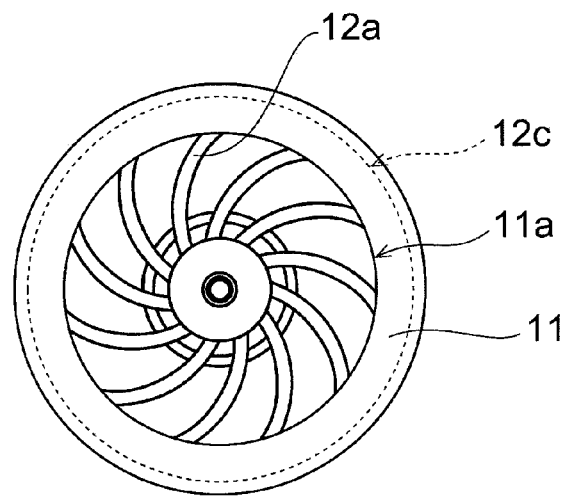
FIG. 8 is a schematic view for illustrating the peripheral position of the lid.

FIG. 8 is a schematic view for illustrating the peripheral position of the lid.

As shown in FIG. 8, preferably, the peripheral position of the lid 11 is located radially outside the peripheral position of the bucket blade 12a (the peripheral position of the holding plate 12c). In this case, the peripheral position of the lid 11 may be the same as (equal in outer radial dimension to) the peripheral position of the bucket blade 12a (the peripheral position of the holding plate 12c) (see, e.g., FIG. 7C).

Accordingly, the lid 11 can be reliably provided in the neighborhood of the outer periphery of the bucket blade 12a, which contributes most to the conversion to rotational energy.

Hence, the thrust force 110 can be reduced, and the power generation efficiency can be increased.

Figures 9A, 9B:
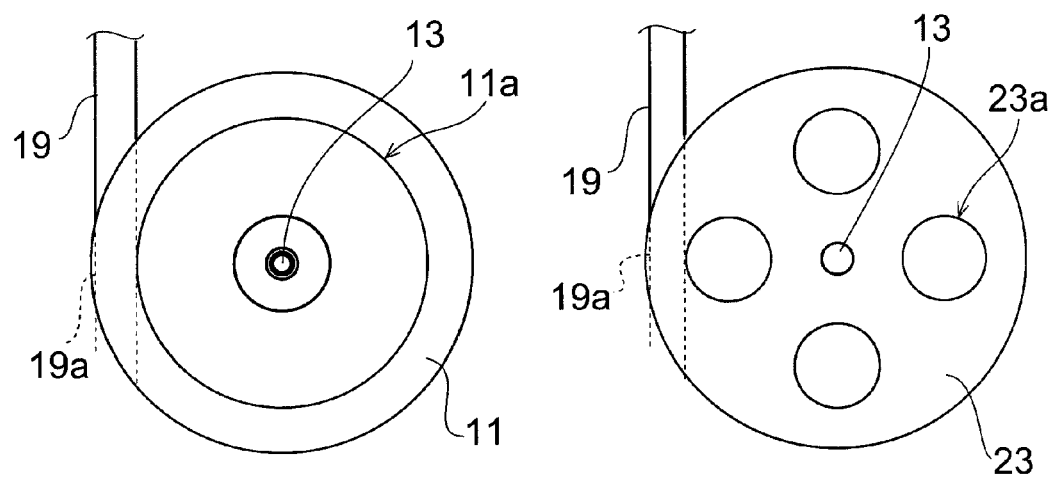
FIGS. 9A and 9B are schematic views for illustrating the relationship between the injection port and the lid. More specifically.

FIGS. 9A and 9B are schematic views for illustrating the relationship between the injection port and the lid. More specifically, FIG. 9A shows the case where the hole 11a is coaxially provided in the lid 11. FIG. 9B shows the case where the holes 23a are disposed with rotational symmetry about the rotation center axis of the bucket 12.

Figure 10:
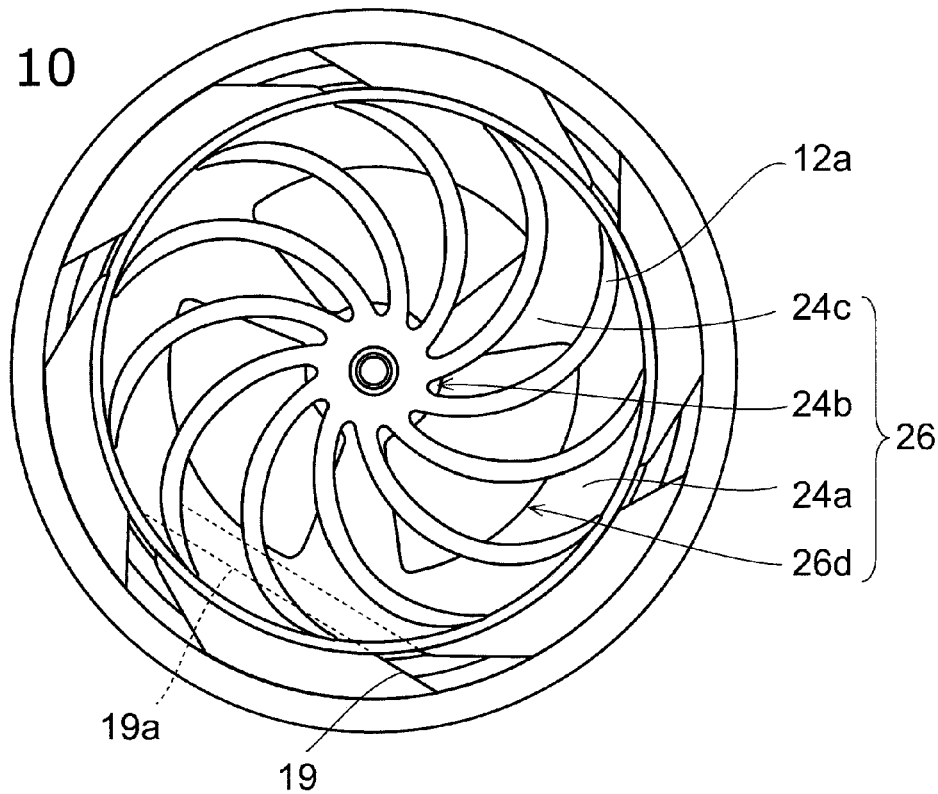
FIG. 10 is a schematic view for illustrating the relationship between the injection port and the lid.

FIG. 10 is also a schematic view for illustrating the relationship between the injection port and the lid. More specifically, FIG. 10 shows the case where the lid having a rib described later is provided (see FIG. 17A).

As shown in FIGS. 9A, 9B, and 10, preferably, the lid (the lid 11, 23, 24a in the examples illustrated in the figures) is provided in the region 19a formed by extending the water just squirted from the injection port 19 to its traveling direction. For instance, the lid can be configured so as to be provided in the region formed by extending the outlet section of the injection port 19 with the width unchanged.

In other words, preferably, the hole (the hole 11a, 23a, 26d in the examples illustrated in the figures) is not provided in the region 19a formed by extending the water just squirted from the injection port 19 to its traveling direction. For instance, the hole can be configured so as not to be provided in the region formed by extending the outlet section of the injection port 19 with the width unchanged.

That is, preferably, the lid covers the region 19a formed by extending the water just squirted from the injection port 19 to its traveling direction, and the hole is disposed on the rotation center axis side (radial inside) of the region 19a.

The water injected from the injection port does the maximum work immediately after inflow to the bucket blade 12a. That is, it is the neighborhood of the outer periphery of the bucket blade 12a that contributes most to the conversion from hydraulic energy to rotational energy. Thus, the power generation efficiency can be increased by providing the lid so as to cover at least the neighborhood of the outer periphery of the bucket blade 12a subjected to the inflow of water (the region 19a formed by extending the water just squirted from the injection port 19 to its traveling direction). Furthermore, a large hole can be provided in a relatively large region on the rotation center axis side (radial inside) of the neighborhood of the outer periphery of the bucket blade 12a. Thus, the effect of reducing the thrust force can also be increased. That is, the effect of reducing the thrust force can be maximized while maintaining the high power generation efficiency.

In other words, preferably, the injection port 19 is formed to enable injection so that the region 19a formed by extending the water just squirted from the injection port 19 to its traveling direction is covered with the lid.

The region 19a formed by extending the water just squirted from the injection port 19 to its traveling direction can be changed by the geometrical dimension of the injection port 19.

Thus, preferably, the injection port 19 is formed to enable injection so that the region 19a formed by extending the water just squirted from the injection port 19 to its traveling direction is covered with the lid.

Accordingly, the inflow water can be effectively prevented from flowing out from the bucket blade 12a to the upstream side. Consequently, high power generation efficiency can be achieved while maintaining the effect of reducing the thrust force.

Furthermore, preferably, the line obtained by extending the rotation center axis side (radial inside) of the outlet section of the injection port 19 is located radially outside the outermost peripheral position of the hole provided in the lid. Here, the term "outermost peripheral position of the hole" is described later. That is, preferably, the line obtained by extending the rotation center axis side of the outlet section of the injection port 19 is located outside the region centered at the rotation center axis and having a radius given by the line segment connecting the rotation center axis to the position farthest from the rotation center axis on the periphery of the hole provided in the lid.

If the line obtained by extending the rotation center axis side (radial inside) of the outlet section of the injection port 19 is located radially outside the outermost peripheral position of the hole provided in the lid, then the inflow water can be effectively prevented from flowing out from the bucket blade 12a to the upstream side. Consequently, high power generation efficiency can be achieved while maintaining the effect of reducing the thrust force.

Accordingly, the lid can be reliably provided in the neighborhood of the outer periphery of the bucket blade 12a, which contributes most to the conversion to rotational energy. Hence, the thrust force 110 can be reduced, and the power generation efficiency can be increased.

Figure 11:
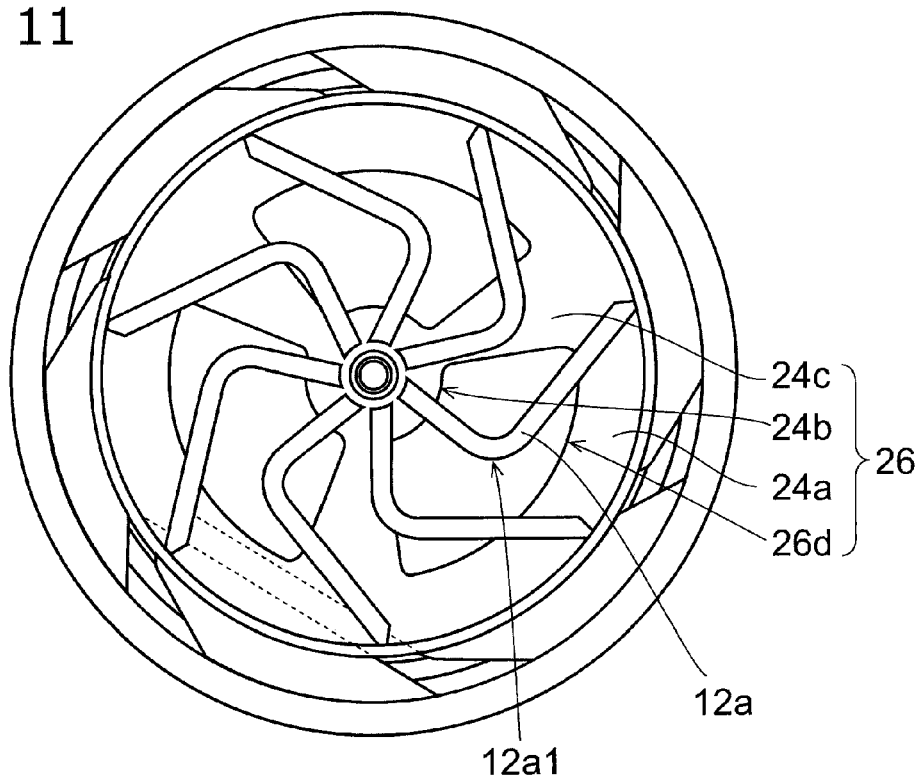
FIG. 11 is a schematic view for illustrating the relationship between the shape of the bucket blade, and the lid.

FIG. 11 is a schematic view for illustrating the relationship between the shape of the bucket blade, and the lid.

The bucket blade 12a may have a curvature changing point 12a1 depending on its shape. The term "curvature changing point" used herein refers to a point where the curvature of the bucket blade changes.

The inflow water impinges on the bucket blade 12a most strongly at the curvature changing point 12a1. Hence, the water may stagnate and generate a vortex at the curvature changing point 12a1. That is, near the curvature changing point 12a1, the water flow may be disturbed and generate a vortex. If the lid is located in the section where the vortex is generated, the thrust force may increase.

Thus, as shown in FIG. 11, preferably, the lid (the lid 24a in the example illustrated in the figure) is not provided in the section including the curvature changing point 12a1 of the bucket blade 12a. That is, preferably, the lid is provided so as to cover the radial outside of the curvature changing point of the bucket blade 12a.

Accordingly, the lid can be configured so as not to cover the section including the curvature changing point 12a1, but to cover the radial outside of the curvature changing point 12a1, i.e., the outer periphery side of the bucket blade 12a as much as possible. Consequently, this can suppress the increase of thrust force due to stagnation and vortices. Furthermore, by covering the outer periphery side of the bucket blade 12a, high power generation efficiency can be achieved.

Here, by providing the lid, the water collided with the bucket blade 12a can be prevented from escaping to the upstream side. However, another problem is that the water escapes to the downstream side in the section where the bucket flow channel 12h has no bottom surface in relation to the lid. Thus, preferably, the relationship between the lid and the bottom surface of the bucket flow channel is configured as follows.

Figure 12:
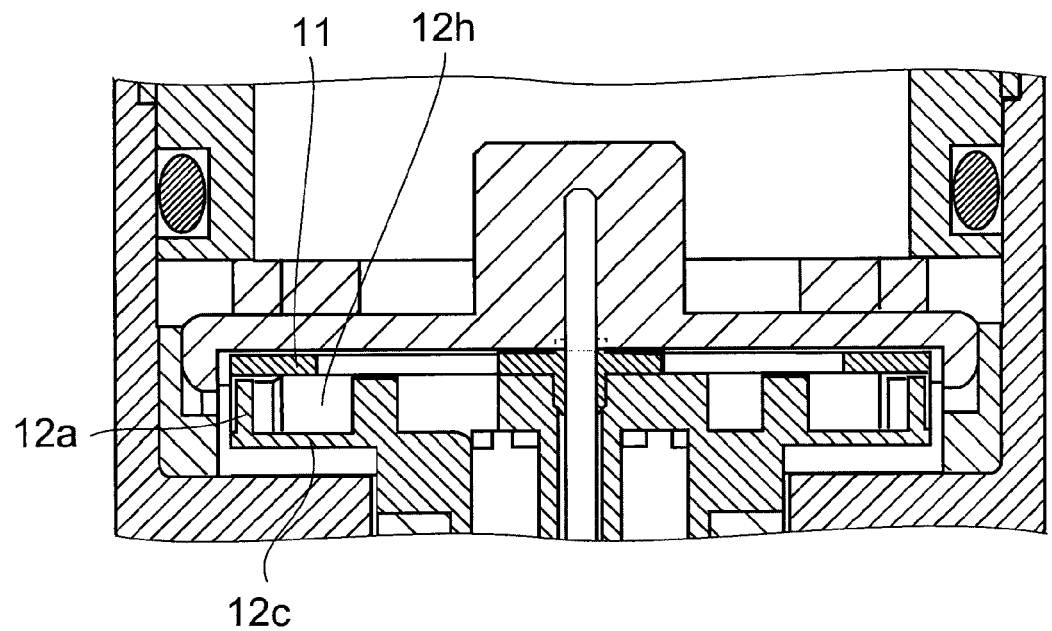
FIGS. 12 and 13 are schematic views for illustrating the relationship between the lid and the bottom surface of the bucket flow channel.
Figure 13:
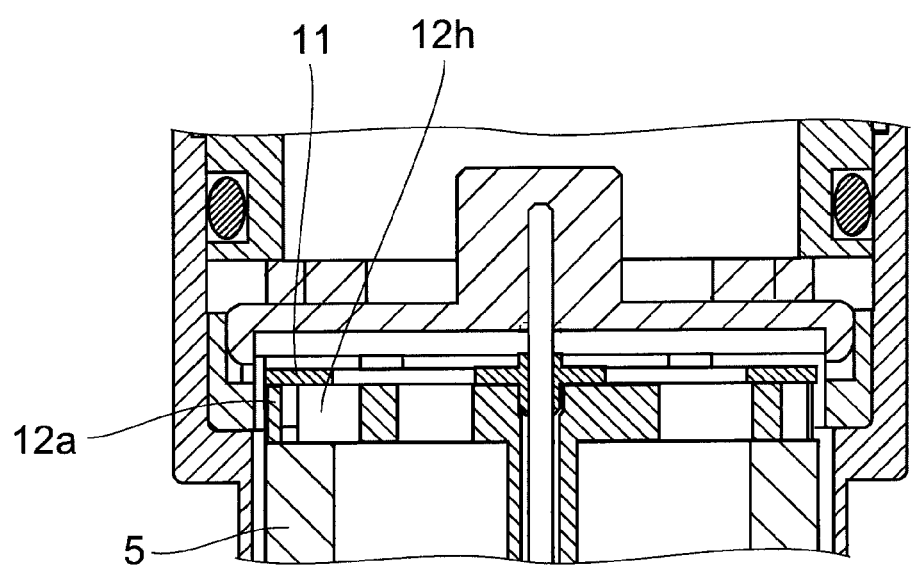

FIGS. 12 and 13 are schematic views for illustrating the relationship between the lid and the bottom surface of the bucket flow channel. More specifically, FIG. 12 shows the case where the bottom surface of the bucket flow channel 12h is given by the holding plate 12c of the bucket 12. FIG. 13 shows the case where the bottom surface of the bucket flow channel 12h is given by the upstream end surface of the magnet 5.

As shown in FIG. 12, preferably, the bottom surface of the bucket flow channel 12h, i.e., the holding plate 12c, is located in the section opposed to the lid 11 provided near the outer periphery of the bucket blade 12a. That is, preferably, the holding plate 12c is provided at least in the section opposed to the lid 11.

By providing the lid 11, the water collided with the bucket blade 12a can be prevented from escaping to the upstream side. However, the water escapes to the downstream side in the section where the bucket flow channel 12h has no bottom surface in relation to the lid 11.

Thus, if a holding plate 12c serving as the bottom surface of the bucket flow channel 12h is provided at least in the section opposed to the lid 11, the escape of water to the downstream side can be suppressed. In particular, the escape of water to the upstream and downstream side can be blocked in the neighborhood of the outer periphery of the bucket blade 12a, which contributes most to the conversion to rotational energy. Thus, high power generation efficiency can be achieved while maintaining the effect of reducing the thrust force.

Also in the case shown in FIG. 13, preferably, the bottom surface of the bucket flow channel 12h, i.e., the upstream end surface of the magnet 5, is located in the section opposed to the lid 11 provided near the outer periphery of the bucket blade 12a.

This can suppress the escape of water to the downstream side. In particular, the escape of water to the upstream and downstream side can be blocked in the neighborhood of the outer periphery of the bucket blade 12a, which contributes most to the conversion to rotational energy. Thus, the power generation efficiency can be increased.

Here, the case of the lid 11 is shown as an example. However, this also applies similarly to the neighborhood of the periphery of the lids 21, 23.

Figure 14A:
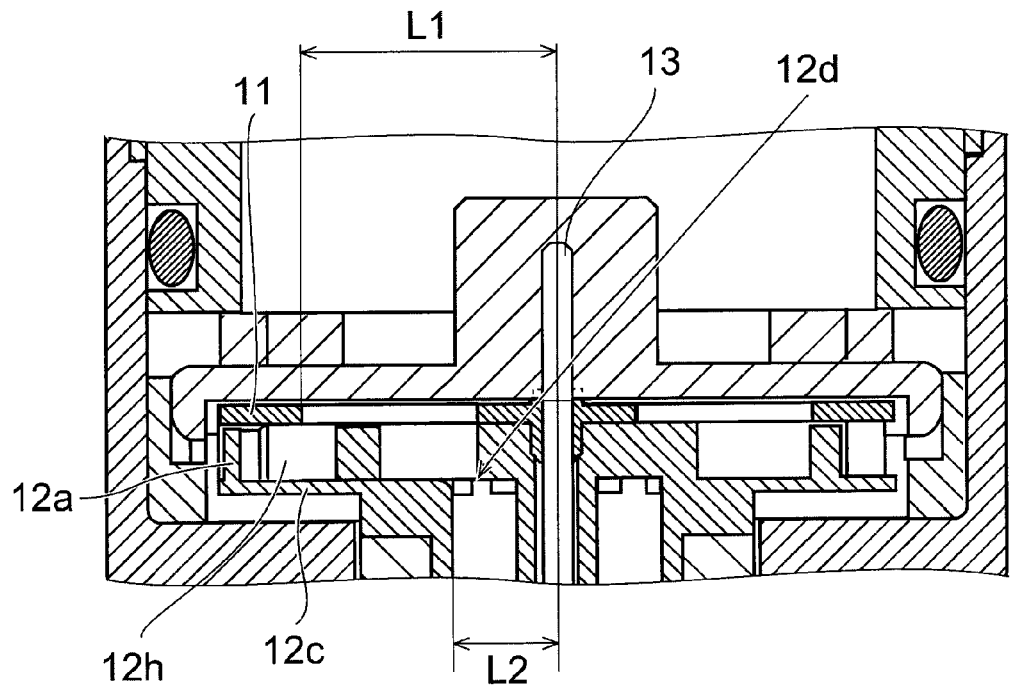
Figure 14B:
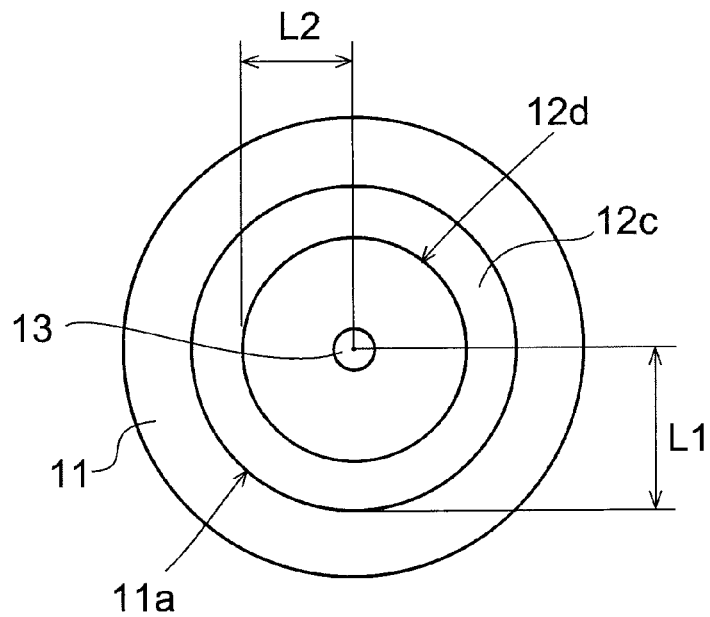
Figure 15A:
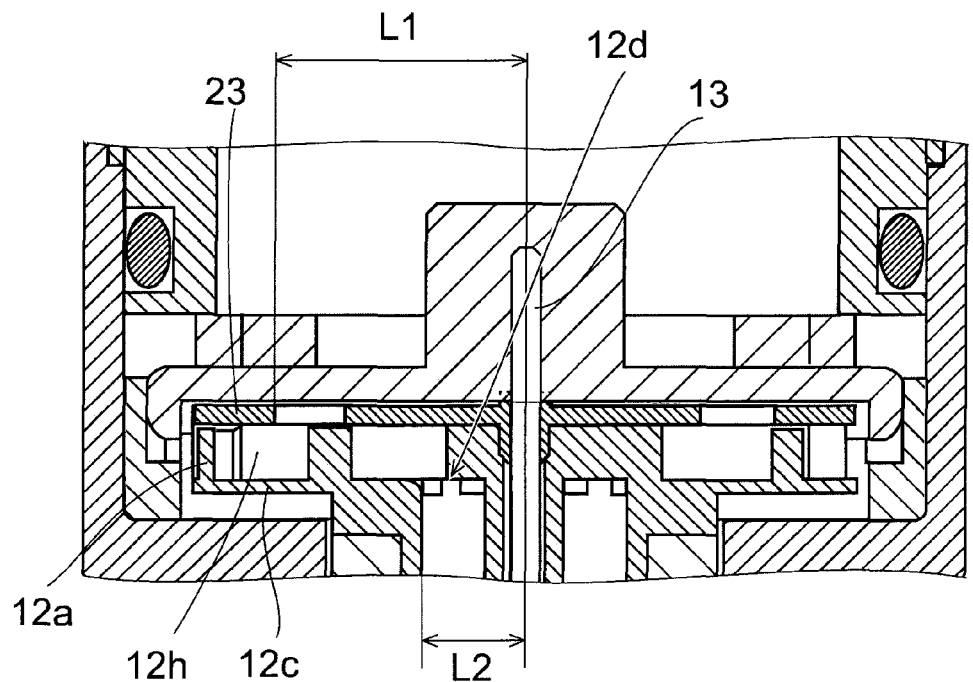
Figure 15B:
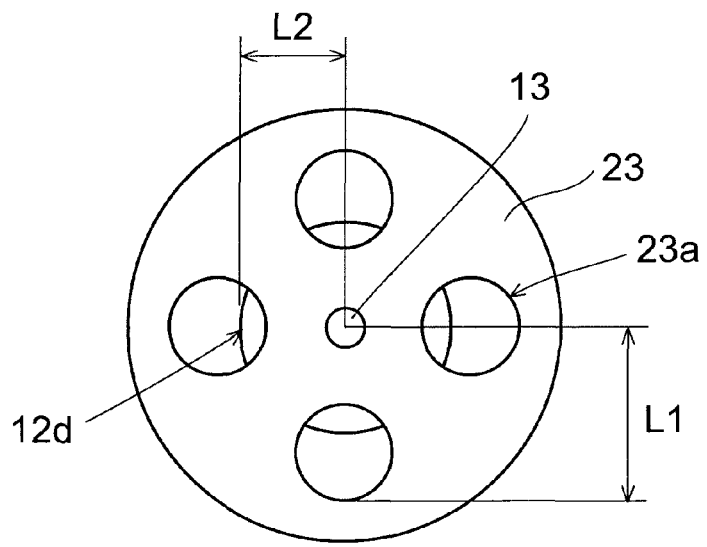

FIGS. 14A to 15B are also schematic views for illustrating the relationship between the lid and the bottom surface of the bucket flow channel. Here, FIGS. 14A and 15A are schematic sectional views. FIGS. 14B and 15B are schematic plan views of the lids.

More specifically, FIGS. 14A to 15B show the case where the bottom surface of the bucket flow channel 12h is given by the holding plate 12c of the bucket 12. FIGS. 14A to 15B illustrate the relationship between the hole of the lid and the hole 12d of the holding plate 12c.

Here, L1 is the dimension from the center of the shaft 13 to the outermost peripheral position of the hole of the lid. L2 is the dimension from the center of the shaft 13 to the periphery of the hole 12d of the holding plate 12c.

In this case, as shown in FIGS. 14A to 15B, it is preferable to satisfy L1>L2. That is, preferably, the dimension from the center of the bucket blade 12a to the outermost peripheral position of the hole provided in the lid is longer than the dimension from the center of the bucket blade 12a to the periphery of the hole provided in the holding plate 12c.

If the range covered with the lid is enlarged, the thrust force may increase. On the other hand, if the range covered with the lid and the holding plate is made too small, the water escapes to the upstream and downstream side.

Thus, in this embodiment, the dimensional relationship of the respective holes is defined so that the range covered with the lid is made smaller than the range covered with the holding plate.

Accordingly, the thrust force can be reduced by decreasing the range covered with the lid, whereas the power generation efficiency can be increased by relatively enlarging the range covered with the holding plate.

Here, in the case of the hole 11a of the lid 11 illustrated in FIGS. 14A and 14B, the outermost peripheral position of the hole of the lid is the peripheral position of the hole 11a. In the case of the hole 23a of the lid 23 illustrated in FIGS. 15A and 15B, the outermost peripheral position of the hole of the lid is the position on the periphery of the hole 23a farthest from the center of the shaft 13.

The above example has illustrated the case where the bottom surface of the bucket flow channel 12h is given by the holding plate 12c of the bucket 12. However, this can also apply similarly to the case where the bottom surface of the bucket flow channel 12h is given by the upstream end surface of the magnet 5 as illustrated in FIG. 13.

Here, attachment of the lid 11 provided near the outer periphery of the bucket blade 12a, for instance, requires center alignment with the shaft 13. Furthermore, as described above, the lid receives not only the thrust force, but also a force from directions crossing the direction of the thrust force due to water pressure and rotation. Thus, the lid having a large hole may be radially deformed.

Figure 16A:
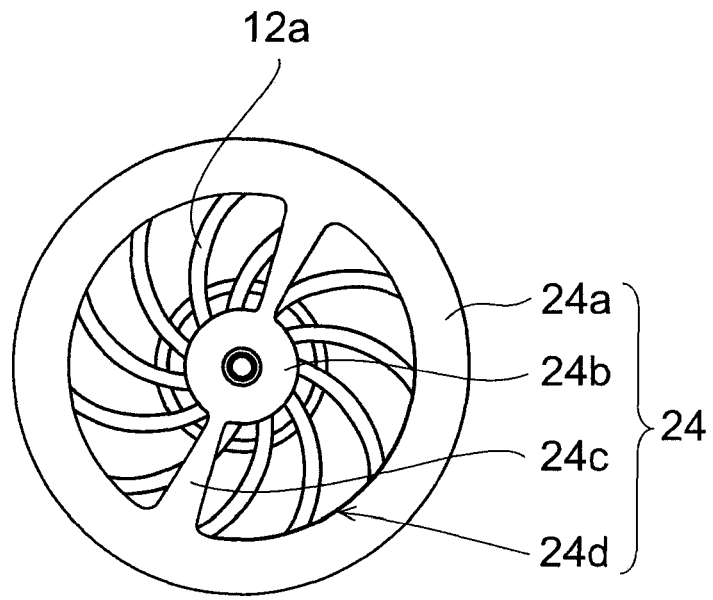
FIGS. 16A and 16B are schematic views for illustrating a peripheral portion, a shaft holder, and a lid having a rib.
Figure 16B:
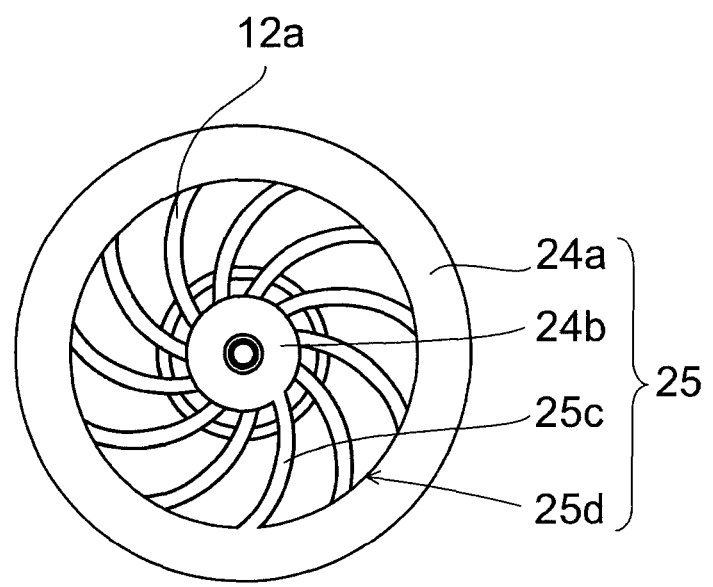

FIGS. 16A and 16B are schematic views for illustrating a peripheral portion, a shaft holder, and a lid having a rib.

As shown in FIG. 16A, the lid 24 includes an annular peripheral portion 24a, a cylindrical shaft holder 24b, and a rib 24c connecting the peripheral portion 24a to the shaft holder 24b. That is, the lid 24 includes an annular peripheral portion 24a provided near the outer periphery of the bucket blade 12a, a shaft holder 24b provided at the rotation center axis of the bucket blade 12a, and a rib 24c connecting the peripheral portion 24a to the shaft holder 24b. In this case, the section other than the rib 24c between the peripheral portion 24a and the shaft holder 24b constitutes a hole 24d.

The annular peripheral portion 24a can be similar to that of the aforementioned lid 11.

At the center of the cylindrical shaft holder 24b, a hole penetrating in the axial direction is provided so that the shaft 13 can be inserted into and held by this hole.

The rib 24c connects the peripheral portion 24a to the shaft holder 24b and integrates them together.

Here, if the lid consists only of an annular peripheral portion 24a provided near the outer periphery of the bucket blade 12a, attachment of the lid requires center alignment with the bucket blade 12a. This may impair the attachment workability.

In this embodiment, a rib 24c is provided to connect the peripheral portion 24a to the shaft holder 24b provided at the rotation center axis of the bucket blade 12a. Thus, insertion of a shaft 13 into the shaft holder 24b can facilitate the center alignment of the annular peripheral portion 24a with the bucket blade 12a. Furthermore, because the peripheral portion 24a and the shaft holder 24b are integrated, the deformation of the lid 24 can be reduced.

The rib 24c thus provided increases the pressure receiving area. However, as viewed in the axial direction of the bucket blade 12a (the acting direction of the thrust force), part of the rib 24c overlaps part of the upstream end surface of the bucket blade 12a. That is, the rib 24c is formed so that at least part of the rib 24c overlaps part of the bucket blade 12a as viewed in the axial direction of the bucket blade 12a. The pressure receiving area does not increase in the section where part of the rib 24c overlaps part of the bucket blade 12a. Hence, impairment of the effect of reducing the thrust force 110 can be suppressed. Consequently, the attachment workability of the lid can be improved while maintaining the effect of reducing the thrust force 110.

As shown in FIG. 16B, the lid 25 includes an annular peripheral portion 24a, a cylindrical shaft holder 24b, and a rib 25c connecting the peripheral portion 24a to the shaft holder 24b. In this case, the section other than the rib 25c between the peripheral portion 24a and the shaft holder 24b constitutes a hole 25d.

The rib 25c connects the peripheral portion 24a to the shaft holder 24b and integrates them together. Furthermore, the rib 25c is shaped so that the rib 25c overlaps the upstream end surface of the bucket blade 12a as viewed in the axial direction of the bucket blade 12a (the acting direction of the thrust force). In this case, the rib 25c may have a shape such that the rib 25c completely overlaps the upstream end surface of the bucket blade 12a, or a shape such that the rib 25c is smaller than the upstream end surface of the bucket blade 12a. For instance, the rib 25c may be shaped so that part of the upstream end surface of the bucket blade 12a appears below the rib 25c as viewed in the axial direction of the bucket blade 12a (the acting direction of the thrust force). That is, as viewed in the axial direction of the bucket blade 12a, the rib 25c is configured so that the rib 25c and the bucket blade 12a are identical in shape, or that the rib 25c is smaller than the bucket blade 12a.

According to this embodiment, as viewed in the axial direction of the bucket blade 12a, the rib 25c does not extend out of the bucket blade 12a. Hence, the pressure receiving area is not increased by providing the rib 25c. Thus, the effect of reducing the thrust force 110 can be further maintained, and the attachment workability of the lid can be improved. Furthermore, the deformation of the lid 25 can also be reduced.

Here, to reduce the thrust force 110, it is preferable to downsize the lid. However, the lid receives not only the thrust force 110, but also a force from directions crossing the direction of the thrust force 110 due to water pressure and rotation. Thus, depending on the size of the lid, the lid may be deformed in the radial or other direction by the force from directions crossing the direction of the thrust force 110.

In this case, the deformation of the lid can be reduced by providing the rib. However, a single rib as shown in FIG. 16B cannot counteract a force acting from various directions. Furthermore, even two ribs as shown in FIG. 16A cannot counteract a force from directions crossing the direction of the ribs. On the other hand, with the increase in the number of ribs, the pressure receiving area increases, and the amount of water flowing out through the hole decreases. This may increase the thrust force.

According to the findings obtained by the inventors, preferably, three ribs are disposed with rotational symmetry about the rotation center axis.

Figure 17A:
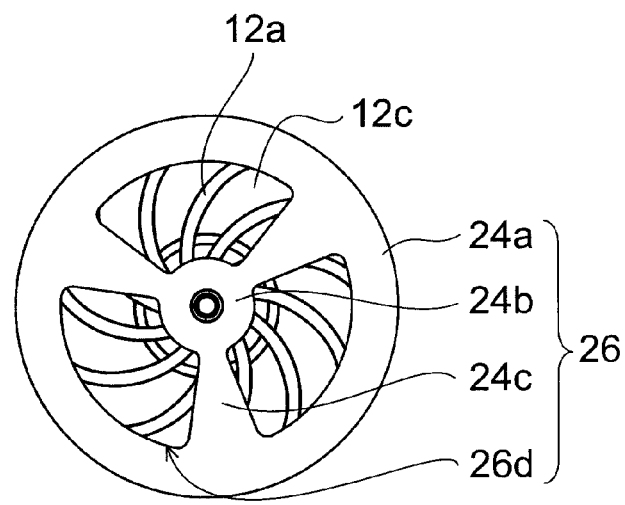
FIGS. 17A to 17C are schematic views for illustrating three ribs disposed with rotational symmetry.
Figure 17B:
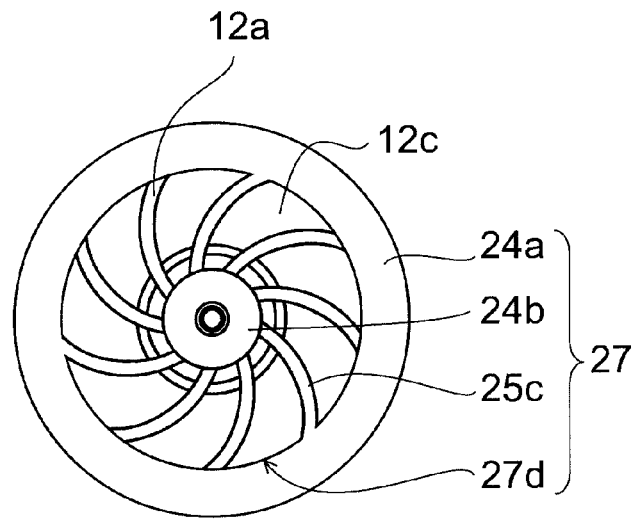
Figure 17C:
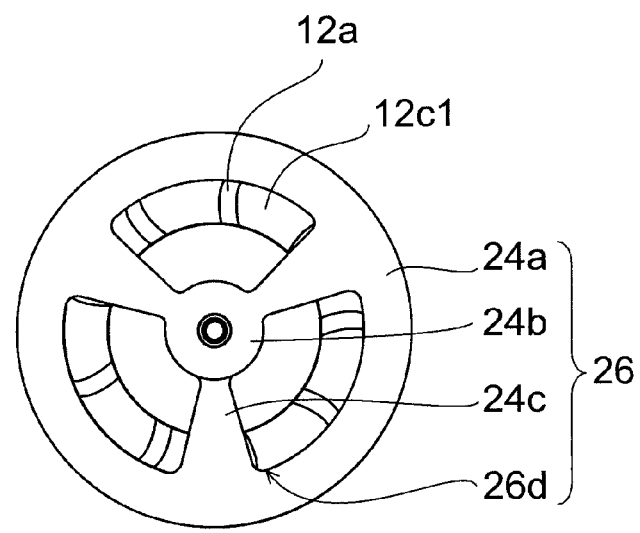

FIGS. 17A to 17C are schematic views for illustrating three ribs disposed with rotational symmetry.

FIG. 17A shows the case where the ribs of the lid 24 illustrated in FIG. 16A are provided in a number of three.

As shown in FIG. 17A, the lid 26 includes an annular peripheral portion 24a, a cylindrical shaft holder 24b, and ribs 24c connecting the peripheral portion 24a to the shaft holder 24b. In this case, three ribs 24c are disposed with rotational symmetry about the rotation center axis. That is, the rib 24c is provided at every 120°. Here, the section other than the ribs 24c between the peripheral portion 24a and the shaft holder 24b constitutes a hole 26d.

FIG. 17B shows the case where the ribs of the lid 25 illustrated in FIG. 16B are provided in a number of three.

As shown in FIG. 17B, the lid 27 includes an annular peripheral portion 24a, a cylindrical shaft holder 24b, and a rib 25c connecting the peripheral portion 24a to the shaft holder 24b. In this case, three ribs 25c are disposed with rotational symmetry about the rotation center axis. That is, the rib 25c is provided at every 120°. Here, the section other than the ribs 25c between the peripheral portion 24a and the shaft holder 24b constitutes a hole 27d.

FIGS. 17A and 17B show the cases where the bucket blade 12a is connected to the bucket boss through the holding plate 12c.

On the other hand, FIG. 17C shows the case where the bucket blade 12a is not connected to the bucket boss. In this case, the bucket blade 12a is connected by the holding plate 12c1

Thus, three ribs disposed with rotational symmetry about the rotation center axis can facilitate center alignment and counteract forces from various directions. Furthermore, while meeting these requirements, the increase of the pressure receiving area can be minimized. Furthermore, the ribs disposed with rotational symmetry about the rotation center axis are effective for load balancing. Thus, the influence of the ribs on the rotation can be suppressed, and hence the rotation of the bucket can be made smooth.

Consequently, this can lead to improvement in attachment workability, improvement in bearing strength against forces from various directions, high power generation efficiency, and reduction of the thrust force.

Next, as a thrust reducer, the pressure chamber 22 provided between the holding plate 12c and the inner wall surface of the downstream end portion 2g of the large diameter portion 2a is illustrated.

Figure 18:
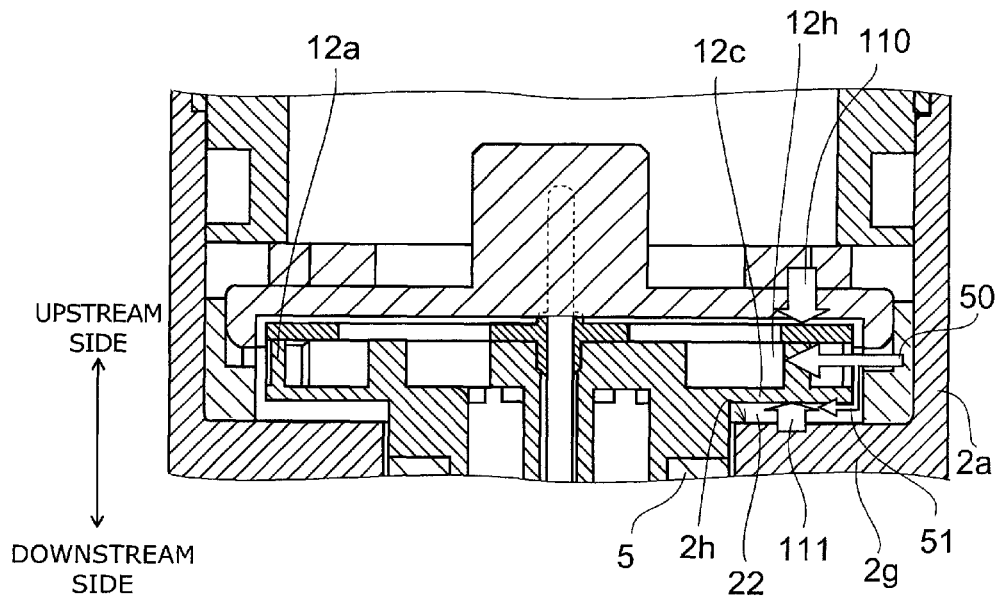
FIG. 18 is a schematic view for illustrating the pressure chamber as a thrust reducer.

FIG. 18 is a schematic view for illustrating the pressure chamber as a thrust reducer.

As shown in FIG. 18, the bucket blade 12a is provided so as to protrude in the radially outside direction of the magnet 5. In the section protruding from the magnet 5, a holding plate 12c is provided. The holding plate 12c is opposed to the inner wall surface 2h of the downstream end portion 2g of the large diameter portion 2a. The holding plate 12c is spaced from the inner wall surface 2h. The gap formed between the holding plate 12c and the inner wall surface 2h constitutes a pressure chamber 22.

In this case, the height dimension of the pressure chamber 22 (the dimension of the gap formed between the holding plate 12c and the inner wall surface 2h) is set smaller than the height dimension (the dimension between the upstream end portion and the downstream end portion of the bucket flow channel 12h) of the main flow channel (bucket flow channel 12h). That is, the dimension (height dimension) of the pressure chamber 22 in the axial direction of the bucket blade 12a is set shorter than the dimension (height dimension) of the space between the bucket blades 12a in the axial direction of the bucket blade 12a.

The pressure chamber 22 is provided on the downstream side of the holding plate 12c. The dimension of the pressure chamber 22 in the axial direction of the bucket blade 12a is made shorter than the dimension of the space between the bucket blades 12a in the axial direction of the bucket blade 12a. That is, the height dimension of the pressure chamber 22 is made shorter than the height dimension of the main flow channel (bucket flow channel 12h). Thus, the water 51 flowing in the pressure chamber 22 has a lower flow rate than the water 50 flowing in the main flow channel (bucket flow channel 12h). Hence, the water in the pressure chamber 22 is less likely to be ejected and causes pressure build-up. Consequently, this generates a force 111 pushing the holding plate 12c to the upstream side. The force 111 pushing the holding plate 12c to the upstream side has an opposite direction to the aforementioned thrust force 110. Hence, the thrust force 110 is canceled.

In this case, if the pressure chamber 22 is provided in conjunction with other thrust reducers (e.g., the hole provided in the lid), the effect of reducing the thrust force 110 can be synergistically increased.

Next, as a thrust reducer, the positional relationship between the end surface of the magnet 5 and the end surface of the yoke 16 is illustrated.

Figure 19:
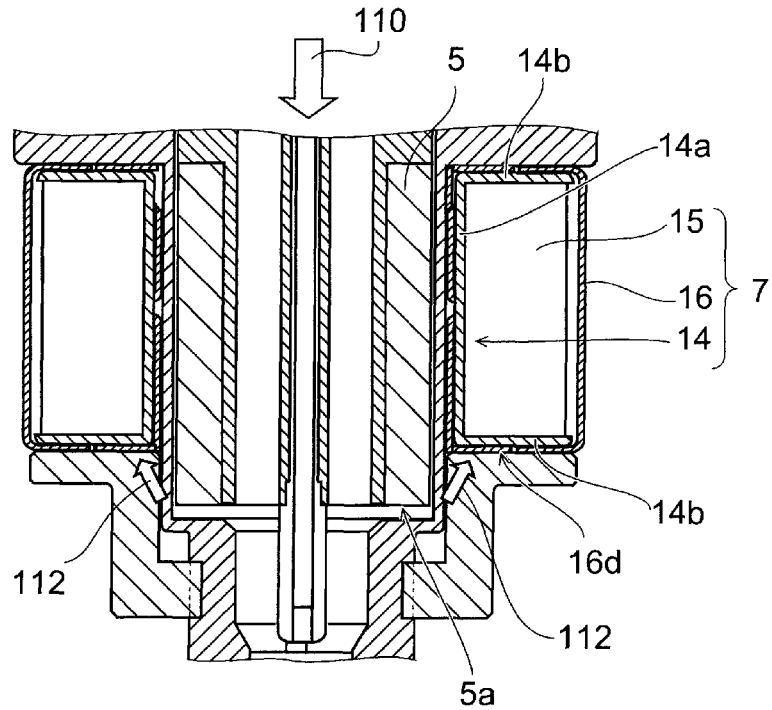
FIG. 19 is a schematic view for illustrating the "positional relationship between the end surface of the magnet and the end surface of the yoke" as a thrust reducer.

FIG. 19 is a schematic view for illustrating the "positional relationship between the end surface of the magnet and the end surface of the yoke" as a thrust reducer. Here, FIG. 19 illustrates the case where one stator 7 is provided.

As described above, the stator 7 includes a bobbin 14, a coil 15, and a yoke 16. The yoke 16 is formed form a magnetic material (e.g., rolled steel). The yoke 16 is provided so as to surround the outer peripheral surface of the coil 15, the end surface of the flange 14b, and the inner peripheral surface of the bobbin boss 14a.

The stator 7 (yoke 16) is disposed in the radial direction of the magnet 5.

In this embodiment, the end surface 5a of the magnet 5 on the acting direction side of the aforementioned thrust force 110 is projected from the end surface 16d of the yoke 16. That is, the first end surface 5a of the magnet 5 on the acting direction side of the thrust force 110 is projected from the first end surface 16d of the yoke on the acting direction side of the thrust force 110. Thus, an attractive force 112 is generated between the projected section of the magnet 5 and the yoke 16 formed from the magnetic material. This force 112 includes a component force in the opposite direction to the thrust force 110, and hence cancels the thrust force 110. Thus, the thrust force 110 can be reduced.

Figure 20:
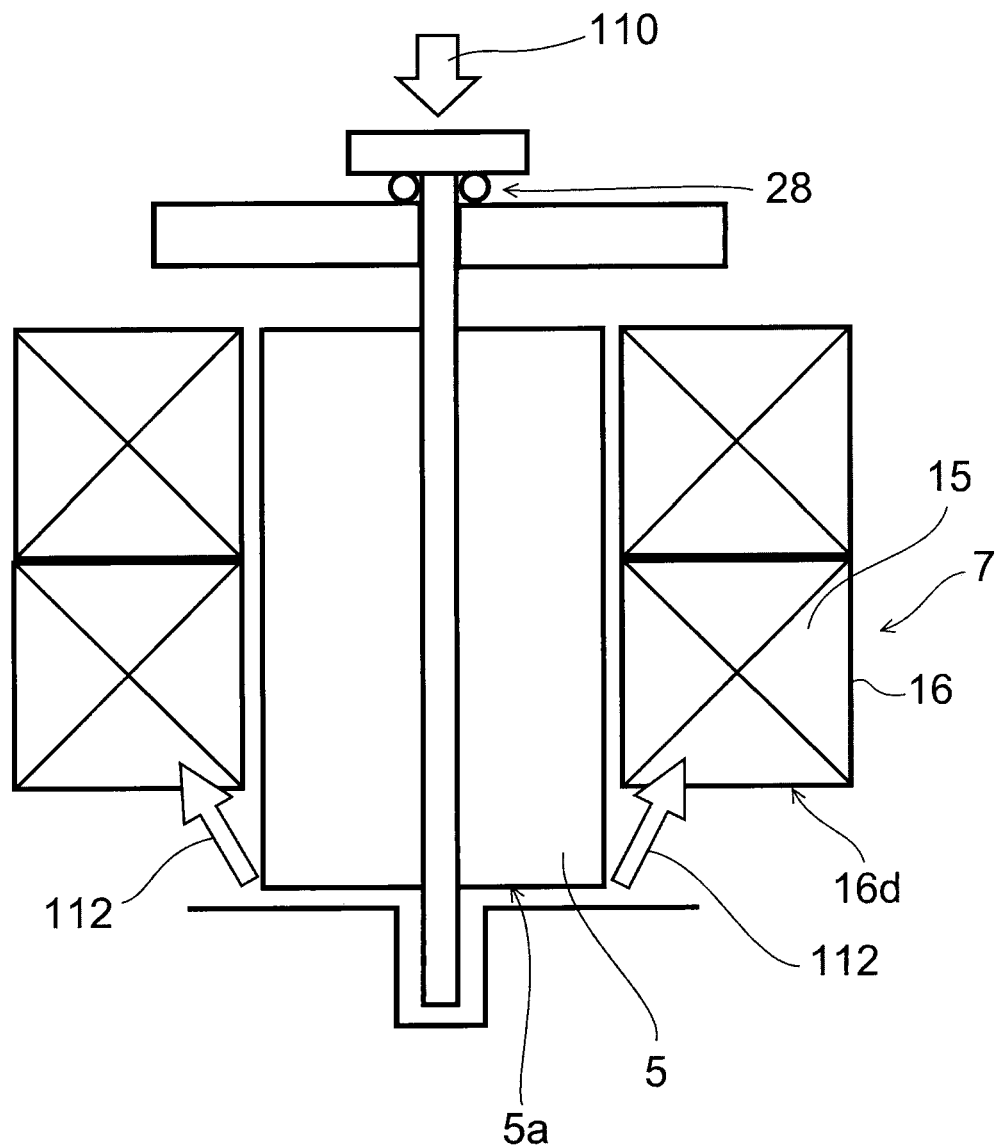
FIG. 20 is also a schematic view for illustrating the "positional relationship between the end surface of the magnet and the end surface of the yoke" as a thrust reducer.

FIG. 20 is also a schematic view for illustrating the "positional relationship between the end surface of the magnet and the end surface of the yoke" as a thrust reducer. Here, FIG. 20 illustrates the case where two stators 7 are provided. Furthermore, this is the case where the holder 28 for supporting the thrust force 110 is provided on the upstream side (opposite side from the acting direction of the thrust force 110).

Also in this embodiment, the end surface 5a of the magnet 5 on the acting direction side of the thrust force 110 is projected from the end surface 16d of the yoke 16. Thus, an attractive force 112 can be generated between the projected section of the magnet 5 and the yoke 16 formed from the magnetic material. Consequently, similarly to the above case, the thrust force 110 can be canceled. Thus, the thrust force 110 can be reduced.

Figure 21:
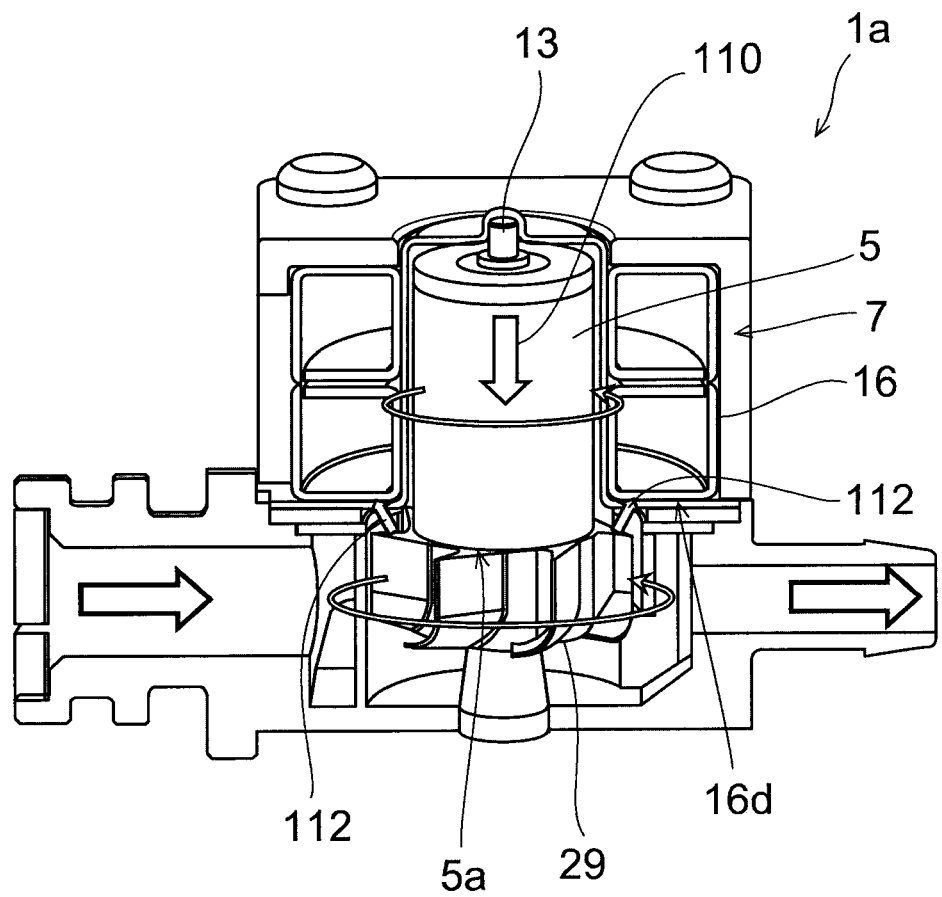
FIG. 21 is also a schematic view for illustrating the "positional relationship between the end surface of the magnet and the end surface of the yoke" as a thrust reducer.

FIG. 21 is also a schematic view for illustrating the "positional relationship between the end surface of the magnet and the end surface of the yoke" as a thrust reducer. While the faucet hydroelectric generator 1 illustrated in FIG. 1 is configured so that the rotation center axis of the bucket 12 is generally parallel to the water supply flow channel, the faucet hydroelectric generator 1a illustrated in FIG. 21 is configured so that the rotation center axis of the bucket 29 is generally perpendicular to the water supply flow channel.

Also in this embodiment, the end surface 5a of the magnet 5 on the acting direction side of the thrust force 110 is projected from the end surface 16d of the yoke 16. Thus, an attractive force 112 can be generated between the projected section of the magnet 5 and the yoke 16 formed from the magnetic material. Consequently, similarly to the above case, the thrust force 110 can be canceled. Thus, the thrust force 110 can be reduced.

Figure 22:
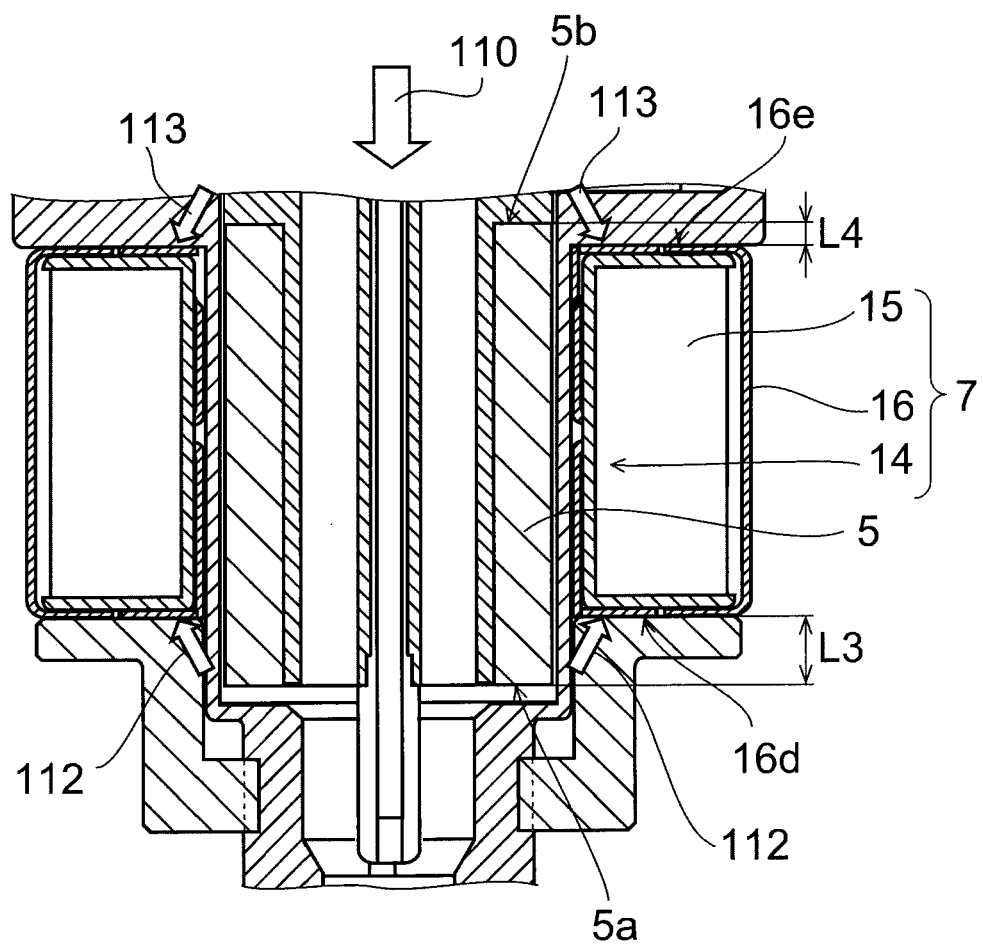
FIG. 22 is a schematic view for illustrating the positional relationship between the end surface of the magnet and the end surface of the yoke.

FIG. 22 is a schematic view for illustrating the positional relationship between the end surface of the magnet and the end surface of the yoke.

When the bucket 12 is vibrated by water flow, the magnet 5 provided integrally with the bucket 12 is also vibrated. Hence, the magnetic flux of the magnet 5 may fail to be sufficiently transmitted to the yoke 16 and cause magnetic flux leakage (hereinafter simply referred to as flux leakage).

This may result in decreased power generation efficiency and nonuniform output. Thus, preferably, both end surfaces of the magnet 5 are projected from both end surfaces of the yoke 16 in order to avoid flux leakage even if the magnet 5 is vibrated. This enables highly efficient and uniform power generation.

However, if the end surface 5*b* of the magnet 5 on the opposite side of the acting direction of the thrust force 110 is projected from the end surface 16*e* of the yoke 16, an attractive force 113 is generated between the projected section of the magnet 5 and the yoke 16. This force 113 includes a component force in the same direction as the thrust force 110, and hence increases the thrust force 110.

Thus, in this embodiment, the projected dimension L3 of the end surface 5*a* of the magnet 5 on the acting direction side of the thrust force 110 is longer than the projected dimension L4 of the end surface 5*b* of the magnet 5 on the opposite side of the acting direction of the thrust force 110. That is, the second end surface 5*b* opposite to the first end surface 5*a* of the magnet 5 is projected from the second end surface 16*e* opposite to the first end surface 16*d* of the yoke 16. Here, the projected dimension L3 of the first end surface 5*a* of the magnet 5 from the first end surface 16*d* of the yoke 16 is longer than the projected dimension L4 of the second end surface 5*b* of the magnet 5 from the second end surface 16*e* of the yoke 16.

Accordingly, the flux leakage can be prevented while achieving the effect of reducing the thrust force 110.

In this case, the projected dimension of the end surface of the magnet from the end surface of the yoke can be set to the "maximum dimension". Here, if the end surface of the magnet is uneven, the "maximum dimension" refers to the dimension to the top of the protrusion of the magnet end surface. On the other hand, if the end surface of the magnet is flat, the "maximum dimension" refers to the dimension to the end surface (flat surface) of the magnet as in the above example.

Figure 23:
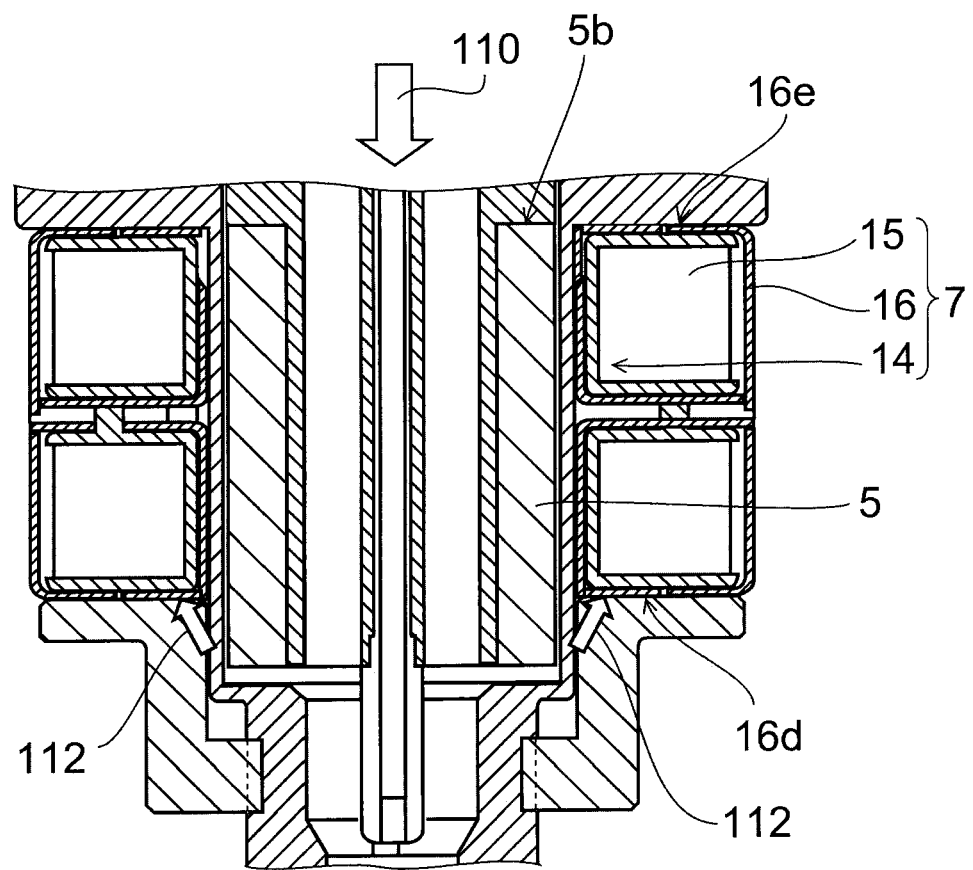
FIG. 23 is a schematic view for illustrating the case where a plurality of stators are provided.

FIG. 23 is a schematic view for illustrating the case where a plurality of stators are provided.

The example shown in FIG. 23 is configured so that the end surface 5*b* of the magnet 5 located on the opposite side of the acting direction of the thrust force 110 is not projected from the end surface 16*e* of the yoke 16. That is, the stator 7 is provided in a plurality so as to be stacked in the acting direction of the thrust force 110 so that the second end surface 5*b* of the magnet 5 is flush with, or located on the acting direction of the thrust force 110 of, the second end surface 16*e* of the yoke 16 provided on the opposite side of the acting direction of the thrust force 110.

Accordingly, the aforementioned force 113 is not generated. Hence, the effect of reducing the thrust force 110 by the force 112 can be directly achieved. However, on the other hand, the aforementioned flux leakage may occur. This may result in decreased power generation efficiency and nonuniform output.

Thus, in this embodiment, a plurality of stators 7 are stacked to suppress the influence of flux leakage. That is, by providing a plurality of stators 7, the stator 7 affected by flux leakage can be limited. For instance, the stator 7 located on the opposite side of the acting direction of the thrust force 110 is affected by flux leakage, but the other stators 7 adjacent thereto are not affected by the flux leakage. Thus, for the plurality of provided stators 7 as a whole, decrease of power generation efficiency and nonuniform output can be suppressed. Consequently, the influence of flux leakage can be suppressed while achieving the effect of reducing the thrust force 110.

Furthermore, as illustrated in FIGS. 22, 23, and 1, the stator 7 is disposed radially outside the magnet 5. By disposing the stator 7 radially outside the magnet 5, the outer peripheral surface side of the magnet 5 having a large surface area can be opposed to the stator 7. This can increase the amount of magnetic flux, and hence increase the amount of power generation. Furthermore, the attractive force increases, and the aforementioned force 112 increases. Hence, the effect of reducing the thrust force 110 can be increased. Furthermore, the size and weight of the magnet 5 required to obtain the same power generation capacity can be reduced. Hence, the thrust force can be reduced also from the viewpoint of weight reduction of the magnet 5.

In the foregoing, as a thrust reducer, the "hole penetrating in the thickness direction of the lid", the "pressure chamber 22 provided between the holding plate 12*c* and the inner wall surface of the downstream end portion 2*g* of the large diameter portion 2*a*", and the "positional relationship between the end surface of the magnet 5 and the end surface of the yoke 16 (stator 7)" have been illustrated.

These thrust reducers can be selectively used as appropriate, or can be used in combination.

Here, the "pressure chamber 22 provided between the holding plate 12*c* and the inner wall surface of the downstream end portion 2*g* of the large diameter portion 2*a*" and the "positional relationship between the end surface of the magnet 5 and the end surface of the yoke 16 (stator 7)" are applicable also to a faucet hydroelectric generator with no lid.

In a faucet hydroelectric generator with a lid, the three types of thrust reducers can be selectively used as appropriate, or can be used in combination. However, in a faucet hydroelectric generator with a lid, it is preferable to provide at least the "hole penetrating in the thickness direction of the lid".

Next, the sealing portion 6 and the nozzle portion 3 are further illustrated.

If the injection port 19 can be accurately formed, the performance of the faucet hydroelectric generator 1 can be improved. Here, the injection port 19 can be accurately formed by integrally molding the nozzle portion including the injection port 19.

However, a component such as the nozzle portion 3 is difficult to die cut or mold because the injection port 19 is provided on the side surface of the nozzle portion 3. In this case, the nozzle portion including the injection port 19 can be formed by dividing the nozzle portion 3 into two components and assembling the divided components.

However, if the divided components are simply assembled, the opening area of the injection port 19 may vary after or during assembly. For instance, after assembly, the divided components may be wobbled by water pressure, and vary the opening area of the injection port 19. In this case, the periphery of the divided components can be fixed with adhesive at a plurality of positions. Then, however, the adhesive run-off may vary the opening area of the injection port 19. Variation in the opening area of the injection port 19 may interfere with appropriate squirting and decrease the power generation efficiency.

Thus, in this embodiment, the nozzle portion 3 is divided into a second nozzle casing 9 and a first nozzle casing 10. Furthermore, the axial position of the second nozzle casing 9 and the first nozzle casing 10 is restricted by the sealing portion 6.

Figure 24A:
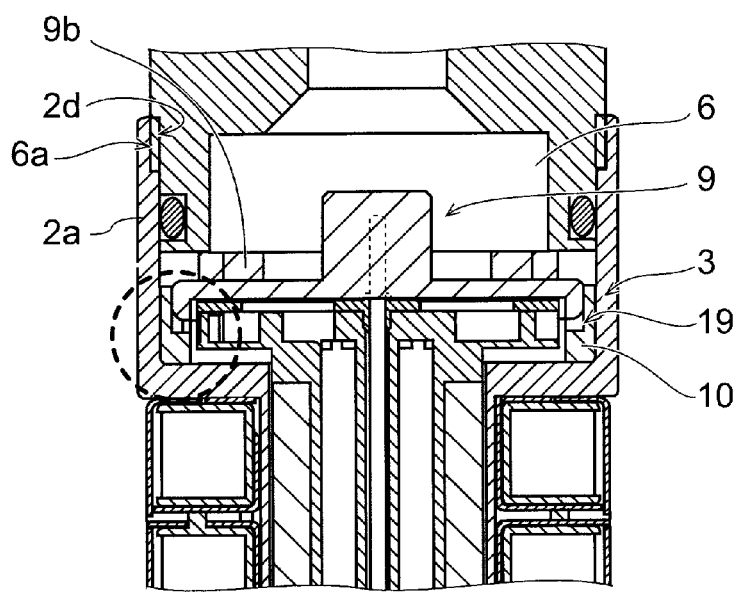
FIG. 24A is a schematic sectional view for illustrating the fixation (abutment) between the first nozzle casing and the second nozzle casing.
Figure 24B:
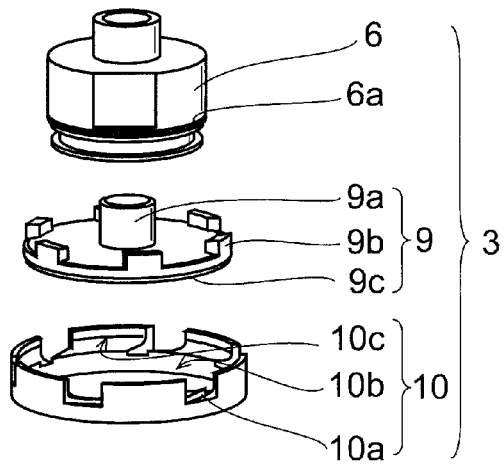
FIG. 24B is a schematic exploded view of the first nozzle casing, the second nozzle casing, and the sealing portion.
Figure 24C:
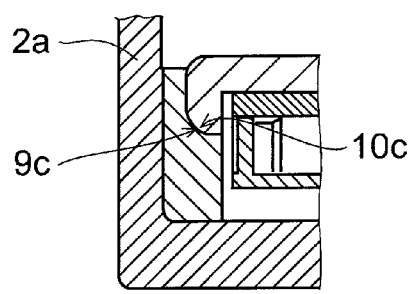
FIG. 24C is a schematic enlarged view for illustrating the second nozzle casing fitted into the first nozzle casing.

FIGS. 24A to 24C are schematic views for illustrating the fixation (abutment) between the first nozzle casing and the second nozzle casing. More specifically, FIG. 24A is a schematic sectional view for illustrating the fixation (abutment) between the first nozzle casing and the second nozzle casing. FIG. 24B is a schematic exploded view of the first nozzle casing, the second nozzle casing, and the sealing portion.

FIG. 24C is a schematic enlarged view for illustrating the second nozzle casing fitted into the first nozzle casing.

As shown in FIG. 24B, a plurality of nozzle grooves 10a penetrating to the stepped hole 10b are provided in the peripheral surface of the first nozzle casing 10. The stepped hole 10b is configured so that the second nozzle casing 9 is fitted therein. When the second nozzle casing 9 is fitted into the stepped hole 10b of the first nozzle casing 10, the second nozzle casing 9 and the nozzle groove 10a form an injection port 19.

As shown in FIG. 24A, a male screw portion 6a is provided on the side surface of the sealing portion 6. A female screw portion 2d provided near the opening at the upstream end of the large diameter portion 2a is screwed with the male screw portion 6a so that the sealing portion 6 can be fixed to the opening at the upstream end of the large diameter portion 2a.

At the periphery of the second nozzle casing 9, a plurality of abutting portions 9b protruding to the upstream side are provided. The upstream end surface of this abutting portion 9b is configured so as to abut the sealing portion 6. When the sealing portion 6 is fixed to the opening at the upstream end of the large diameter portion 2a, the axial position of the abutting portions 9b is restricted by the sealing portion 6, so that the second nozzle casing 9 and the first nozzle casing 10 are fixed inside the large diameter portion 2a.

As shown in FIG. 24C, when the first nozzle casing 10 is fixed inside the large diameter portion 2a, the peripheral surface of the first nozzle casing 10 abuts the inner wall surface of the large diameter portion 2a. Furthermore, when the second nozzle casing 9 is fitted into the stepped hole 10b of the first nozzle casing 10, the end portion of the second nozzle casing 9 abuts the stepped section of the stepped hole 10b. Here, preferably, the guiding portion 9c provided at the end periphery of the second nozzle casing 9 abuts the corner portion 10c of the stepped section of the stepped hole 10b.

That is, the nozzle portion 3 includes a first nozzle casing 10 and a second nozzle casing 9. At the center of the first nozzle casing 10, a stepped hole 10b is opened to the end surface on the sealing portion 6 side. At the periphery of the first nozzle casing 10, a plurality of nozzle grooves 10a are opened to the end surface on the sealing portion 6 side. At the periphery of the second nozzle casing 9, an abutting portion 9b protrudes toward the sealing portion 6. The second nozzle casing 9 is fitted so as to occlude the opening of the stepped hole 10b of the first nozzle casing 10. An injection port 19 is formed from the nozzle groove 10a of the first nozzle casing 10 and the second nozzle casing 9. The sealing portion 6 causes the second nozzle casing 9 to abut the first nozzle casing 10 via the abutting portion 9b. Here, the abutting portion 9b may be provided on the second nozzle casing 9, or on the sealing portion 6.

The first nozzle casing 10 has a surface abutting the inner wall surface of the cylinder portion 2. The second nozzle casing 9 includes a guiding portion 9c at the end periphery on the first nozzle casing 10 side. When the second nozzle casing 9 is fitted into the stepped hole 10b of the first nozzle casing 10, the guiding portion 9c abuts the corner portion 10c of the bottomed hole.

According to this embodiment, the nozzle portion 3 is divided into the second nozzle casing 9 and the first nozzle casing 10. This can facilitate die cutting and molding.

Furthermore, the second nozzle casing 9 is fitted into the stepped hole 10b of the first nozzle casing 10 so that the second nozzle casing 9 and the nozzle groove 10a form an injection port 19. Thus, the injection port 19 can be accurately formed.

Furthermore, the sealing portion 6 causes the second nozzle casing 9 to abut the first nozzle casing 10 via the abutting portion 9b. Thus, because no adhesive is used, there is no danger of variation in the opening area of the injection port 19.

Furthermore, because the second nozzle casing 9 is caused to abut the first nozzle casing 10, there is no danger that the second nozzle casing 9 and the first nozzle casing 10 are deformed by water pressure. Thus, there is no danger of variation in the opening area of the injection port 19 during power generation, and stable power generation can be performed.

Here, if water pressure is applied by water flow, the sealing portion 6 is lifted, and the abutting portion 9b abutting the sealing portion 6 is disengaged. However, in that case, the second nozzle casing 9 is pressed against the first nozzle casing 10 by the water pressure. This can suppress variation in the opening area of the injection port 19.

Furthermore, because the second nozzle casing 9 is fitted into the stepped hole 10b of the first nozzle casing 10, radial misalignment between the second nozzle casing 9 and the first nozzle casing 10 can be suppressed. Furthermore, variation in the opening area of the injection port 19 due to radial misalignment between the second nozzle casing 9 and the first nozzle casing 10 can be suppressed. Furthermore, the guiding portion 9c provided at the end periphery of the second nozzle casing 9 can improve workability in fitting the second nozzle casing 9 into the stepped hole 10b of the first nozzle casing 10. Furthermore, the peripheral surface of the first nozzle casing 10 abuts the inner wall surface of the large diameter portion 2a, and the end portion of the second nozzle casing 9 abuts the stepped section of the stepped hole 10b. Thus, water leakage from these sections can be suppressed.

Furthermore, the guiding portion 9c at the end periphery of the second nozzle casing 9 can be provided as a round shape. Thus, when the direction of incoming water flowing parallel to the rotation center axis is changed so that the water is squirted in the plane generally perpendicular to the rotation center axis from radially outside the bucket blade 12a toward the bucket blade 12a, separation of the water flow can be suppressed, and pressure loss can be suppressed.

Next, the setting portion 17 is further illustrated.

As illustrated in FIGS. 1, 4A, and 4B, in the case where a plurality of stators 7 are stacked, the relative positioning accuracy of the stators 7 in the circumferential direction, and the accuracy of the dimension between the stators 7 are important. For instance, if the stators 7 have the same circumferential position, or phase, then cogging occurs. Thus, the circumferential positions of the stators 7 need to be shifted from each other. Furthermore, if the stators 7 are made too close to each other, magnetic interference may occur therebetween. Thus, the stators 7 need to be spaced from each other.

In this case, a positioning pin can be provided on the end surface of one stator 7, and a positioning hole can be provided on the end surface of the other stator 7. Thus, the relative circumferential position of the stators 7 and the relative axial position of the stators 7 (the dimension between the stators 7) can be set.

However, if the relative circumferential positioning of the stators 7 and the relative axial positioning of the stators 7 are performed in this manner, subsequent adjustment is made impossible.

Thus, in this embodiment, a setting portion 17 is provided between the stators 7.

Figure 25A:
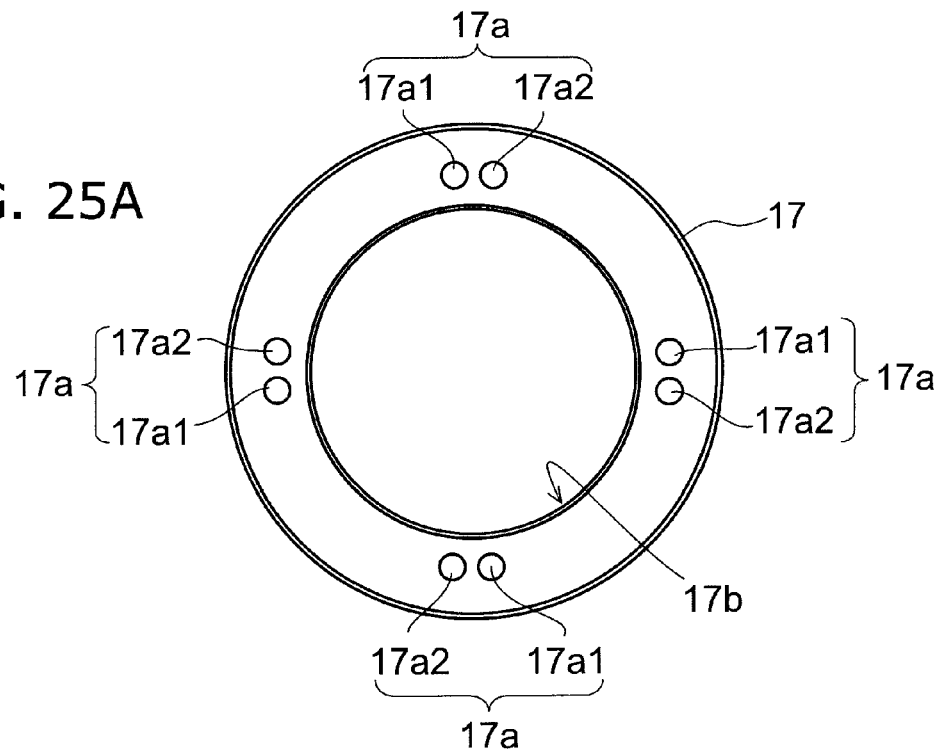
FIG. 25A is a schematic plan view for illustrating the setting portion and FIG. 25B is a schematic sectional view for illustrating positioning by the setting portion.
Figure 25B:
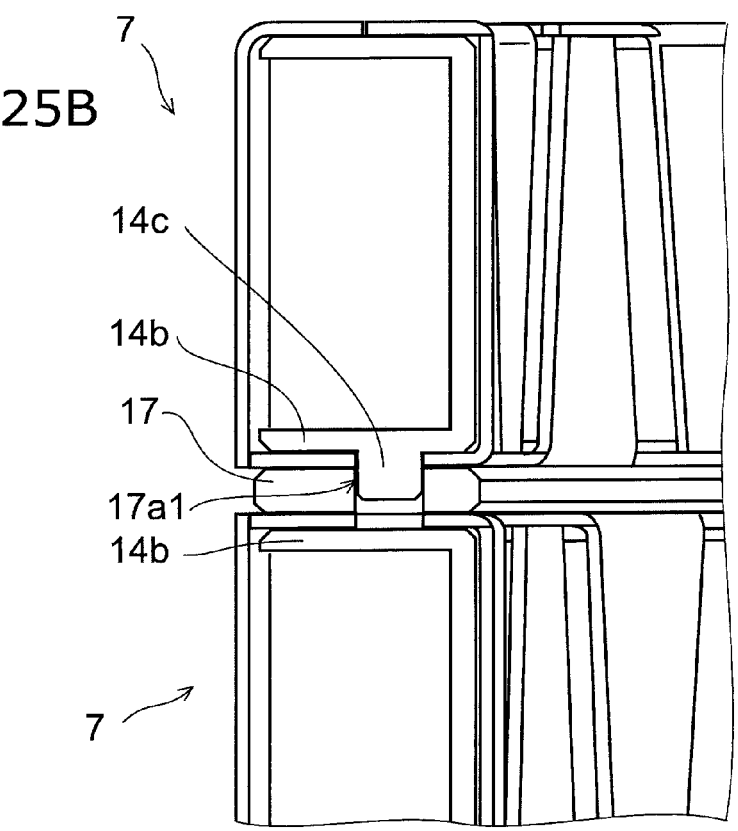

FIGS. 25A and 25B are schematic views for illustrating the setting portion. More specifically, FIG. 25A is a schematic plan view for illustrating the setting portion. FIG. 25B is a schematic sectional view for illustrating positioning by the setting portion.

As shown in FIG. 25A, the setting portion 17 has an annular shape, with a hole 17b provided at its center. On the circle with a prescribed dimension from the center, a depression 17a to be fitted with the protrusion 14c is provided. The depression 17a is provided in a number of four for one stator 7. The depressions 17a are shifted from each other so as to avoid cogging. For instance, the depression 17a1 can be intended for the upstream stator 7, and the depression 17a2 can be intended for the downstream stator 7. The thickness dimension of the setting portion 17 is such that magnetic interference between the stators 7 can be suppressed.

As shown in FIG. 25B, a protrusion 14c is provided on the flange 14b provided on the side where the stators 7 are opposed to each other. The protrusion 14c is shaped like a cylindrical column. The protrusion 14c is fitted into a depression 17a provided in the setting portion 17 so that the stators 7 can be positioned relative to each other in the circumferential direction. Furthermore, the stators 7 can be positioned relative to each other in the axial direction via the setting portion 17.

Here, the setting portion 17 is provided with a depression 17a, and the flange 14b is provided with a protrusion 14c. However, alternatively, the setting portion 17 may be provided with a protrusion, and the flange 14b may be provided with a depression. Furthermore, while the protrusion 14c is provided on the flange 14b in the foregoing, the protrusion 14c may be provided on the yoke 16. That is, the protrusion or depression only needs to be provided on the end surface of the stator 7 on the side where the stators are opposed to each other. Furthermore, the depression can be a through hole or a bottomed hole.

Thus, a protrusion for relative positioning of the stators 7 is provided on one of the setting portion 17 and the end surface of the stator 7 on the side where the stators are opposed to each other, and a depression to be fitted with the protrusion is provided on the other.

According to this embodiment, the setting portion 17 having a simple configuration can be used to set the relative circumferential position and the relative axial position of the stators 7. Furthermore, the relative circumferential position, or phase, of the stators 7 can be adjusted by changing the position of the depressions 17a (depression 17a1, depression 17a2) provided on the setting portion 17. Furthermore, the relative axial position of the stators 7, i.e., the dimension between the stators 7, can be adjusted by changing the thickness dimension of the setting portion 17. Thus, if any adjustment thereof is required in the future, the requirement can be met by replacement with an appropriate setting portion 17. That is, there is no need of extensive work such as changing the position of the protrusion 14c.

Figure 26:
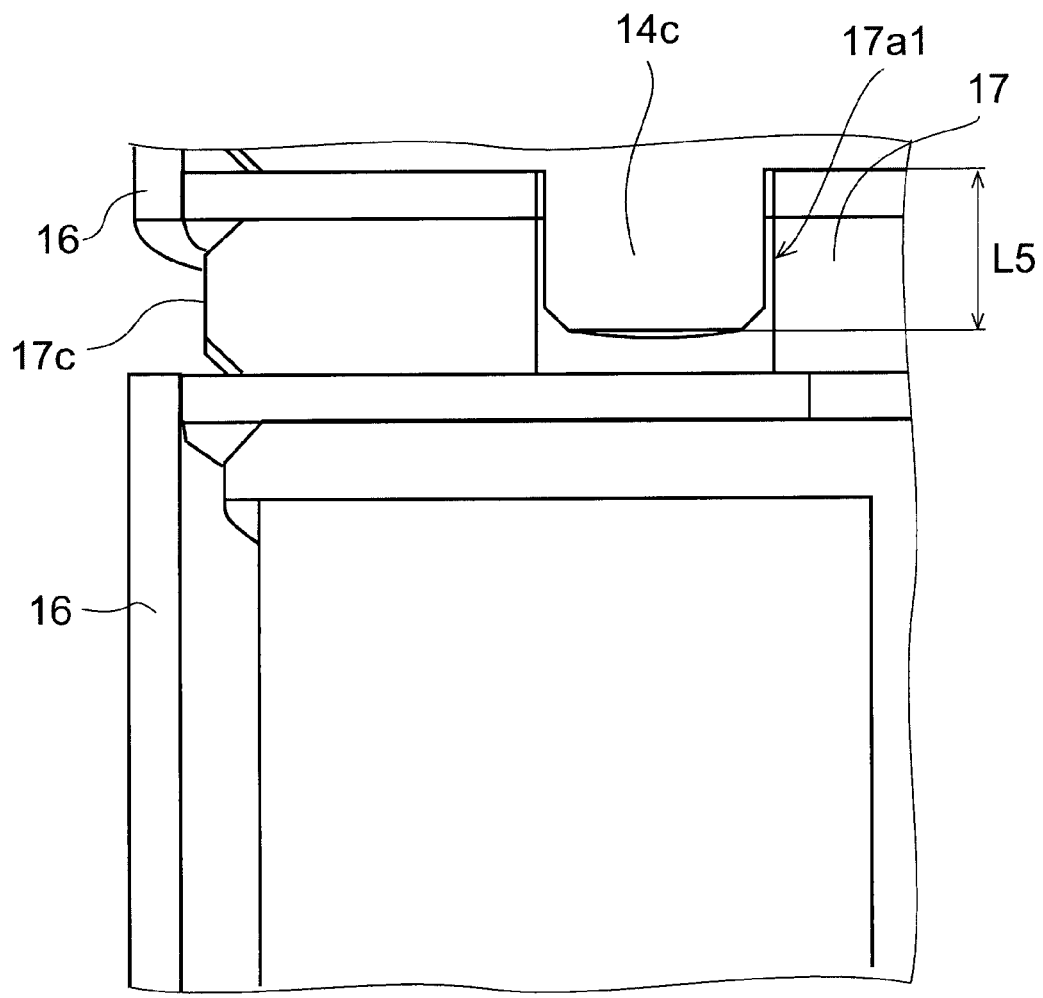
FIG. 26 is a schematic view for illustrating the relationship between the protrusion and the yoke.

FIG. 26 is a schematic view for illustrating the relationship between the protrusion and the yoke.

As shown in FIG. 26, preferably, the length dimension L5 of the protrusion 14c is longer than half the length dimension (depth dimension) of the depression 17a formed as a through hole, i.e., half the thickness dimension of the setting portion 17.

Accordingly, when the protrusions 14c of the opposed stators 7 are inserted into the same depression, it can be noticed by the operator. That is, misinsertion of the protrusion 14c can be prevented.

Furthermore, the position of the outer periphery 17c of the setting portion 17 is radially inside the inner wall surface of the yoke 16. That is, the outer periphery 17c of the setting portion 17 is located inside the inner wall surface of the yoke 16, which is provided radially outside the setting portion 17.

Accordingly, when the stators 7 are stacked in the axial direction via the setting portion 17, interference between the outer periphery 17c of the setting portion 17 and the inner wall of the yoke 16 can be prevented. Thus, when the stators 7 are stacked, misalignment and deformation of the yoke 16 can be prevented.

Next, attachment of the magnet according to other embodiments is illustrated.

Figure 27A:
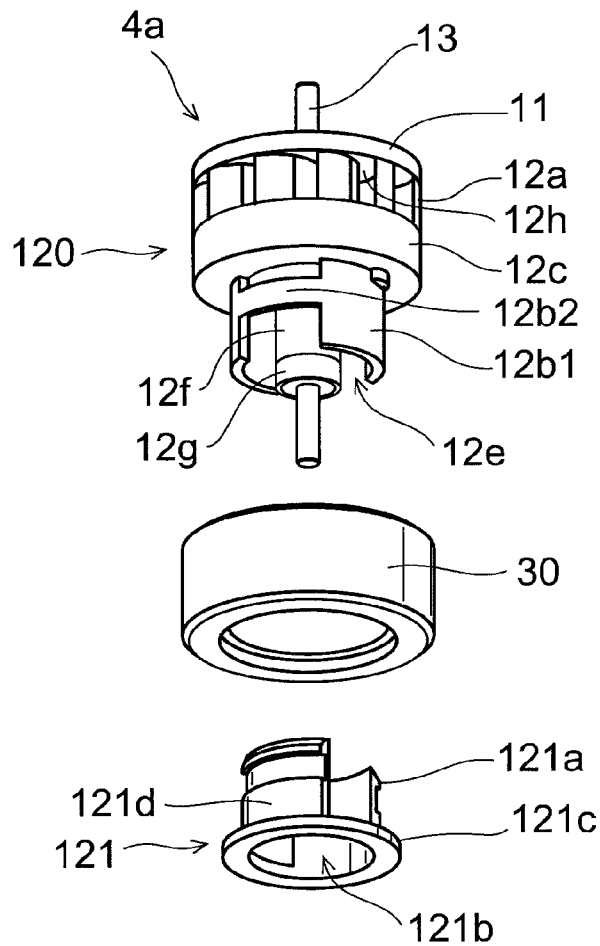
FIG. 27A is a schematic exploded view for illustrating attachment of the magnet.
Figure 27B:
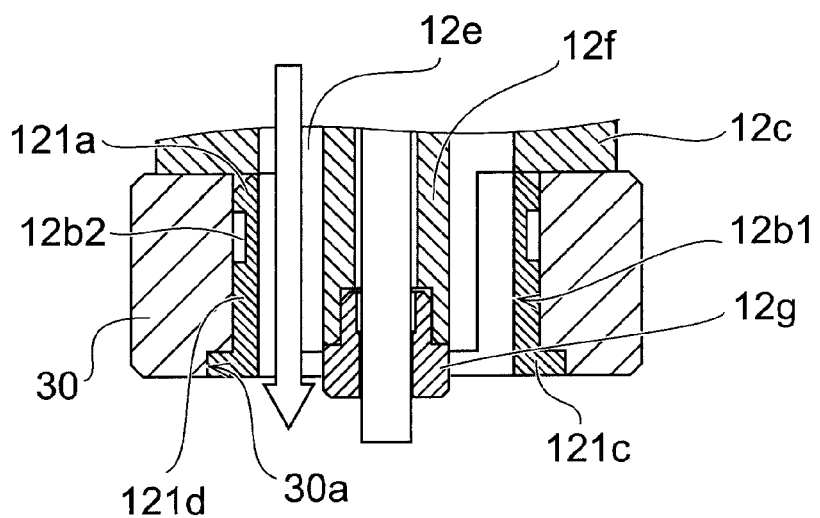
FIG. 27B is a schematic sectional view for illustrating attachment of the magnet.

FIGS. 27A and 27B are schematic views for illustrating attachment of the magnet. More specifically, FIG. 27A is a schematic exploded view for illustrating attachment of the magnet. FIG. 27B is a schematic sectional view for illustrating attachment of the magnet. The arrow depicted in FIG. 27B indicates the direction of flowing water.

As shown in FIG. 27A, the rotor 4a includes a lid 11, a bucket 120, a shaft 13, and a magnet holder 121. The bucket 120 includes a bucket blade 12a, a bucket boss 12b1, and a holding plate 12c.

The bucket boss 12b1 is provided on the downstream side of the holding plate 12c. The bucket boss 12b1 includes therein a hole 12e penetrating in the axial direction, like the bucket boss 12b illustrated in FIG. 1. The hole 12e serves as a flow channel for allowing the water passed through the bucket flow channel 12h to flow to the downstream side. At the center of the bucket boss 12b1, an insertion portion 12f for inserting the shaft 13 is provided. At the downstream end of the insertion portion 12f, a holder 12g for causing the insertion portion 12f to hold the shaft 13 is provided.

Furthermore, the bucket boss 12b1 includes a locking portion 12b2 for engaging a locking tab 121a provided on the magnet holder 121.

The magnet holder 121 includes a flange 121c and a locking boss 121d. At the center of the magnet holder 121, a hole 121b having the same diameter dimension as the hole 12e is provided. When the magnet holder 121 is engaged with the bucket 120, the hole 121b constitutes a flow channel in conjunction with the hole 12e.

The locking boss 121d is provided upright from the annular flange 121c. The locking tab 121a is provided at the end of the locking boss 121d. Here, the outer periphery of the flange 121c is provided on the opposite side from the flow channel. Thus, the magnet 30 can be held without blocking the flow of water in the flow channel.

On the outer peripheral surface (radially outside end surface) of the bucket boss 12b1 and the locking boss 121d, a cylindrical magnet 30 is provided. The outer peripheral surface (radially outside end surface) of the magnet 30 is alternately magnetized to N pole and S pole along the circumferential direction. At the opening of the through hole provided at the center of the magnet 30, a seat portion 30a is provided. The seat portion 30a has a size such that the flange 121c can be embedded therein.

When the magnet 30 is held on the bucket 120, first, the bucket boss 12b1 is inserted into the through hole provided at the center of the magnet 30. Here, the bucket boss 12b1 is inserted from the end surface side without the seat portion 30a. Next, the locking boss 121d of the magnet holder 121 is inserted from the end surface side provided with the seat portion 30a. The locking tab 121a is engaged with the locking portion 12b2 of the bucket boss 12b1, and thereby the magnet 30 is held on the bucket 120.

Figure 28A:
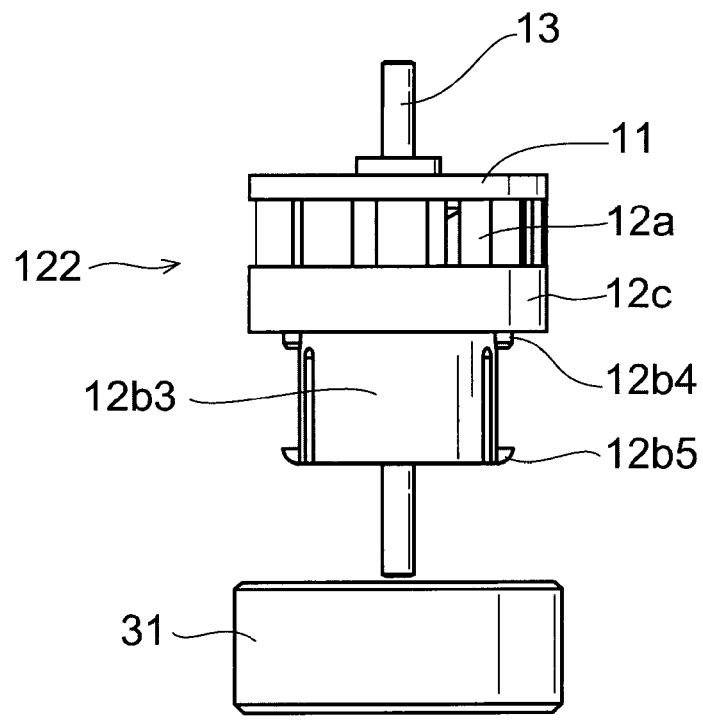
FIG. 28A is a schematic exploded view for illustrating attachment of the magnet and FIG. 28B is a schematic perspective view of the magnet.
Figure 28B:
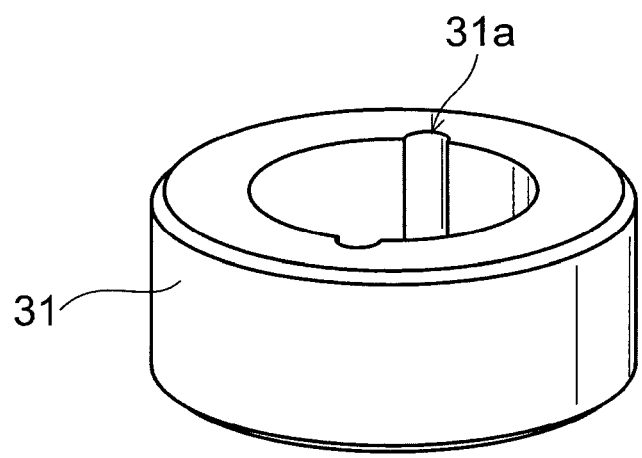

FIGS. 28A and 28B are also schematic views for illustrating attachment of the magnet. More specifically, FIG. 28A is a schematic exploded view for illustrating attachment of the magnet. FIG. 28B is a schematic perspective view of the magnet.

As shown in FIG. 28A, a bucket boss 12b3 is provided on the downstream side of the holding plate 12c of the bucket 122. Near the upstream end of the bucket boss 12b3, a projection 12b4 for engaging an engaging groove 31a provided on the magnet 31 is provided. Near the downstream end of the bucket boss 12b3, a locking tab 12b5 is provided. The locking tab 12b5 is provided at a position such that the locking tab 12b5 can be engaged with the end surface of the magnet 31.

On the outer peripheral surface (radially outside end surface) of the bucket boss 12b3, a cylindrical magnet 31 is provided. The outer peripheral surface (radially outside end surface) of the magnet 31 is alternately magnetized to N pole and S pole along the circumferential direction. On the through hole provided at the center of the magnet 31, an engaging groove 31a penetrating in the axial direction is provided.

When the magnet 31 is held on the bucket 122, the bucket boss 12b3 is inserted into the through hole provided at the center of the magnet 31. Here, the projection 12b4 and the locking tab 12b5 are engaged with the engaging groove 31a of the magnet 31. When the bucket boss 12b3 is completely inserted, the locking tab 12b5 is engaged with the end surface of the magnet 31, and the magnet 31 is held on the bucket 122.

According to this embodiment, the projection 12b4 is engaged with the engaging groove 31a. Hence, circumferential misalignment of the magnet 31 can be prevented. Thus, the rotation of the bucket 122 can be reliably transmitted to the magnet 31. Furthermore, the aforementioned magnet holder 121 can be omitted.

Figure 29A:
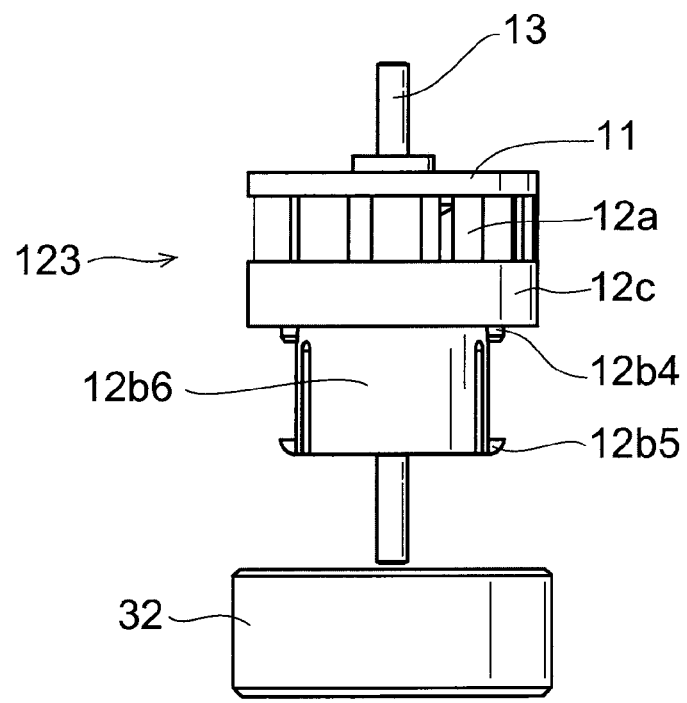
FIG. 29A is a schematic exploded view for illustrating attachment of the magnet and FIG. 29B is a schematic perspective view of the magnet.
Figure 29B:
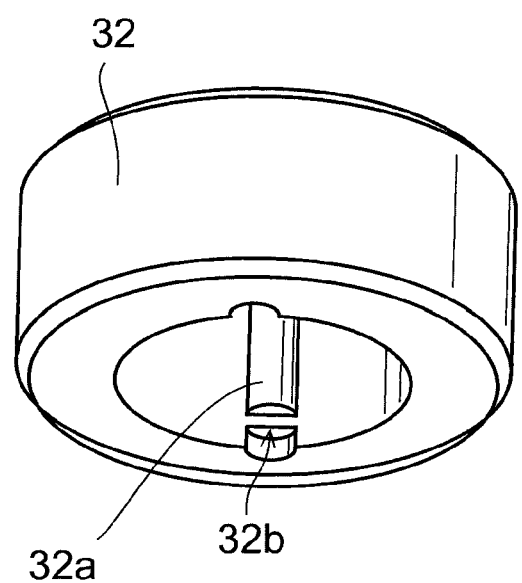
Figure 30:
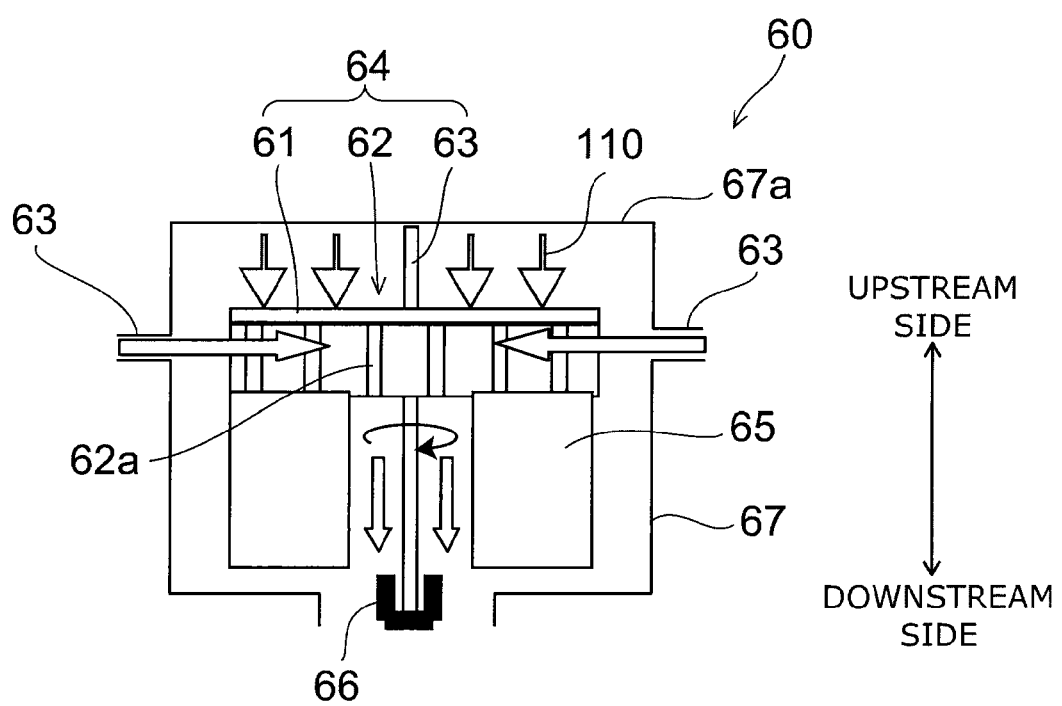
FIG. 30 is a schematic view for describing the thrust force acting on the bucket.

FIGS. 29A and 29B are also schematic views for illustrating attachment of the magnet. More specifically, FIG. 29A is a schematic exploded view for illustrating attachment of the magnet. FIG. 29B is a schematic perspective view of the magnet.

As shown in FIG. 29A, a bucket boss 12b6 is provided on the downstream side of the holding plate 12c of the bucket 123. Near the upstream end of the bucket boss 12b6, a projection 12b4 for engaging an engaging groove 32a provided on the magnet 32 is provided. Near the downstream end of the bucket boss 12b6, a locking tab 12b5 is provided. The locking tab 12b5 is provided at a position such that the locking tab 12b5 can be engaged with a locking portion 32b provided on the locking groove 32a.

On the outer peripheral surface (radially outside end surface) of the bucket boss 12b6, a cylindrical magnet 32 is provided. The outer peripheral surface (radially outside end surface) of the magnet 32 is alternately magnetized to N pole and S pole along the circumferential direction. On the through hole provided at the center of the magnet 32, an engaging groove 32a is provided. A locking portion 32b is provided on the locking groove 32a.

When the magnet 32 is held on the bucket 123, the bucket boss 12b6 is inserted into the through hole provided at the center of the magnet 32. Here, the projection 12b4 and the locking tab 12b5 are engaged with the engaging groove 32a of the magnet 32. When the bucket boss 12b6 is completely inserted, the locking tab 12b5 is engaged with the locking portion 32b, and the magnet 32 is held on the bucket 123.

According to this embodiment, the projection 12b4 is engaged with the engaging groove 32a. Hence, circumferential misalignment of the magnet 32 can be prevented. Thus, the rotation of the bucket 123 can be reliably transmitted to the magnet 32. Furthermore, the aforementioned magnet holder 121 can be omitted. Furthermore, the tip of the bucket boss 12b6 does not protrude from the end surface of the magnet 32.

Next, the operation of the faucet hydroelectric generator 1 is illustrated.

The flowing water poured into the cylinder portion 2 from a piping, not shown, connected to the sealing portion 6 is spread in the radially outside direction by the second nozzle casing 9. Then, as shown in FIG. 1, incoming water flowing parallel to the rotation center axis is squirted in the plane generally perpendicular to the rotation center axis from radially outside the bucket blade 12a toward the bucket blade 12a.

The water squirted toward the bucket blade 12a flows in the bucket flow channel 12h along the bucket blade 12a from the inlet side toward the outlet side of the bucket blade 12a. Then, the water passes through the hole 12d, the hole 12e, and the small diameter portion 2c and is ejected to the outside of the faucet hydroelectric generator 1.

On the other hand, when the bucket 12 is rotated by the force of water squirted toward the bucket blade 12a, the magnet 5 fixed thereto is also rotated. The radially outside end surface (outer peripheral surface) of the magnet 5 is alternately magnetized to N pole and S pole along the circumferential direction (rotation direction). Hence, when the magnet 5 is rotated, the polarity of the inductors 16a, 16b and the base 16c adjacent thereto opposed to the radially outside end surface (outer peripheral surface) of the magnet 5 is varied. This varies the direction of interlinkage magnetic flux in the coil 15 and generates electromotive force in the coil 15, thereby generating electrical power.

As described above, when water passes inside the faucet hydroelectric generator 1, a thrust force 110 is generated. In particular, with the increase of flow rate, a larger thrust force 110 is generated. However, the faucet hydroelectric generator includes the aforementioned thrust reducer. Hence, the generated thrust force 110 can be reduced.

Furthermore, the amount of water flowing in the bucket flow channel 12h can be increased by the lid provided at the upstream end of the bucket blade 12a. Hence, the power generation efficiency can be increased.

Furthermore, as described above, the injection port 19 of the nozzle portion 3 can be accurately provided. Hence, stable power generation can be performed. Furthermore, the axial position of the second nozzle casing 9 and the first nozzle casing 10 is restricted by the sealing portion 6. Hence, there is no danger that the second nozzle casing 9 and the first nozzle casing 10 are deformed by water pressure. Furthermore, if water pressure lifting the sealing portion 6 is applied during power generation, the abutting portion 9b abutting the sealing portion 6 is disengaged. However, in that case, the second nozzle casing 9 is pressed against the first nozzle casing 10 by the water pressure. This can suppress variation in the opening area of the injection port 19. Thus, there is no danger of variation in the opening area of the injection port 19 during assembly and power generation of the power generator. Hence, stable power generation can be performed.

The invention claimed is:
1. A faucet hydroelectric generator comprising:
  a cylinder portion including a supply water inflow port and a supply water outflow port and having a supply water flow channel formed in the cylinder;
  a bucket having a rotation center axis generally parallel to the supply water flow channel, and including a bucket blade provided in the supply water flow channel so as to be rotatable about the rotation center axis;
  a magnet rotatable integrally with the bucket;

a coil configured to generate electromotive force by rotation of the magnet;

a nozzle portion including at least one injection ports configured to cause incoming water flowing parallel to the rotation center axis to be squirted in a plane generally perpendicular to the rotation center axis from radially outside the bucket blade toward the bucket blade; and a lid provided at an upstream end of the bucket blade and configured to rotate integrally with the bucket blade, the lid including a thrust reducer configured to reduce a thrust force applied to the bucket, the lid being provided between a first space and a second space, the bucket blade being located in the second space, the thrust reducer configured to reduce a pressure of the first space by communicating the first space and the second space through the lid.

2. The generator according to claim 1, wherein the thrust reducer provided in the lid is a hole penetrating through the lid in an axial direction of the bucket blade, and is disposed with rotational symmetry about a point where the rotation center axis intersects with plane of the lid.

3. The generator according to claim 2, wherein the lid covers a region formed by extending the water just squirted from the injection port to a traveling direction of the water, and the hole is disposed on a side of the rotation center axis of the region.

4. The generator according to claim 2, wherein the injection port is formed to be able to perform injection so that the lid covers a region formed by extending the water just squirted from the injection port to a traveling direction of the water.

5. The generator according to claim 4, wherein the hole includes an edge portion located on a periphery of the hole and farthest from the rotation center axis, the injection port includes a first side extending along a direction perpendicular to the rotation center axis and a second side provided between the first side and the rotation center axis and extending in the direction perpendicular to the rotation center axis, as projected in a plane perpendicular to the rotation center axis and including the hole, a shortest distance between the rotation center axis and a line extending from the second side is not less than a distance between the rotation center axis and the edge portion.

6. The generator according to claim 4, wherein the lid is provided so as to cover a radial outside of a curvature changing point of the bucket blade.

7. The generator according to claim 4, further comprising:
a holding plate provided at a downstream end of the bucket blade and rotated integrally with the bucket blade,
the holding plate being provided at least in a section opposed to the lid.

8. The generator according to claim 7, wherein
the holding plate includes a hole, and
a dimension from a center of the bucket blade to a peripheral position farthest from the center of the bucket blade on a periphery of the hole provided in the lid is longer than a dimension from the center of the bucket blade to a periphery of the hole provided in the holding plate.

9. The generator according to claim 7, further comprising:
a pressure chamber on a downstream side of the holding plate,
a dimension of the pressure chamber in the axial direction of the bucket blade being shorter than a dimension of space between the bucket blades in the axial direction of the bucket blade.

10. The generator according to claim 9, wherein the hole of the holding plate is provided near a center of the holding plate and communicates with a flow channel configured to allow the water squirted toward a major surface of the bucket blade to flow to the downstream side.

11. The generator according to claim 2, wherein the lid is provided so as to cover at least an outer periphery of the bucket blade.

12. The generator according to claim 2, wherein
the lid includes an annular peripheral portion provided near a periphery of the bucket blade, a shaft holder provided at the rotation center axis of the bucket blade, and
a rib connecting the peripheral portion to the shaft holder, and the rib is formed so that at least a part of the rib overlaps a part of the bucket blade as viewed in the axial direction of the bucket blade.

13. The generator according to claim 12, wherein as viewed in the axial direction of the bucket blade, the rib is configured so that the rib and the bucket blade are identical in shape, or that the rib is smaller than the bucket blade.

14. The generator according to claim 12, wherein three ribs are disposed in rotational symmetry about the rotation center axis.

* * * * *

UNITED STATES PATENT AND TRADEMARK OFFICE
CERTIFICATE OF CORRECTION

| | |
|---|---|
| PATENT NO. | : 8,461,705 B2 |
| APPLICATION NO. | : 12/893117 |
| DATED | : June 11, 2013 |
| INVENTOR(S) | : Masahiro Kuroishi et al. |

It is certified that error appears in the above-identified patent and that said Letters Patent is hereby corrected as shown below:

In the specification, column 30, line 34, please add -- 1 -- after "generator"

Signed and Sealed this
Seventeenth Day of September, 2013

Teresa Stanek Rea
*Deputy Director of the United States Patent and Trademark Office*